US009648609B2

(12) United States Patent
Kawasaki

(10) Patent No.: US 9,648,609 B2
(45) Date of Patent: May 9, 2017

(54) COMMUNICATION SYSTEM, BASE STATION, AND COMMUNICATION TERMINAL

(71) Applicant: FUJITSU LIMITED, Kawasaki-shi, Kanagawa (JP)

(72) Inventor: Yoshihiro Kawasaki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/357,544

(22) Filed: Nov. 21, 2016

(65) Prior Publication Data

US 2017/0070982 A1 Mar. 9, 2017

Related U.S. Application Data

(63) Continuation of application No. PCT/JP2014/067282, filed on Jun. 27, 2014.

(51) Int. Cl.
*H04W 72/04* (2009.01)

(52) U.S. Cl.
CPC ...... *H04W 72/042* (2013.01); *H04W 72/0446* (2013.01)

(58) Field of Classification Search
CPC ....... H04W 8/005; H04W 92/18; H04W 4/02; H04W 4/023; H04W 52/0235; H04W 52/146; H04W 72/082; H04W 72/042; H04W 72/0446; H04L 5/0069
See application file for complete search history.

(56) References Cited

U.S. PATENT DOCUMENTS

| 2014/0056230 A1* | 2/2014 | Dimou | H04W 72/048 370/329 |
| 2014/0323126 A1* | 10/2014 | Ro | H04W 8/005 455/434 |
| 2014/0376458 A1* | 12/2014 | Ryu | H04W 72/085 370/329 |

(Continued)

OTHER PUBLICATIONS

Samsung, "Mode 1 resource allocation for D2D broadcast communication", Agenda Item: 6.2.5.2.2, 3GPP TSG-RAN WG1 Meeting #77, R1-142112, Seoul, Republic of Korea, May 19-23, 2014.

(Continued)

*Primary Examiner* — Nizar Sivji
(74) *Attorney, Agent, or Firm* — Myers Wolin, LLC

(57) ABSTRACT

A communication system includes a base station, a first communication terminal, and a second communication terminal, wherein the base station notifies the second communication terminal of a wireless resource allocation result using control information including a first region, a second region, and a third region, sets the second region and the third region to have values in a first specific combination when notifying, using the first region, the second communication terminal of a first allocation result of a first wireless resource allocated to communication between the base station and the second communication terminal, and sets the second region and the third region to have values in a second specific combination different from the first specific combination when notifying, using the first region, the second communication terminal of a second allocation result of a second wireless resource allocated to direct communication between the second communication terminal and the first communication terminal.

12 Claims, 13 Drawing Sheets

(56) References Cited

U.S. PATENT DOCUMENTS

| | | | |
|---|---|---|---|
| 2015/0223279 A1* | 8/2015 | Jiao | H04W 48/12 370/312 |
| 2016/0112977 A1* | 4/2016 | Byun | H04W 56/0015 370/350 |
| 2016/0198504 A1* | 7/2016 | Seo | H04W 76/023 370/329 |
| 2016/0278059 A1* | 9/2016 | Fukuta | H04W 8/005 |
| 2017/0034825 A1* | 2/2017 | Harada | H04W 8/005 |

OTHER PUBLICATIONS

NEC, "D2D and cellular resource multiplexing configuration", Agenda Item: 6.2.5.2.2, 3GPP TSG-RAN WG1 Meeting #77, R1-142173, Seoul, Republic of Korea, May 19-23, 2014.

3GPP TR 36.913 V9.0.0, "3rd Generation Partnership Project; Technical Specification Group Radio Access Network; Requirements for further advancements for Evolved Universal Terrestrial Radio Access (E-UTRA) (LTE-Advanced) (Release 9)", Dec. 2009.

ETSI TR 136 912 V9.3.0, "LTE; Feasibility study for Further Advancements for E-UTRA (LTE-Advanced) (3GPP TR 36.912 version 9.3.0 Release 9)", Jun. 2010.

3GPP TS 36.321 V10.2.0, "3rd Generation Partnership Project; Technical Specification Group Radio Access Network; Evolved Universal Terrestrial Radio Access (E-UTRA); Medium Access Control (MAC) protocol specification (Release 10)", Jun. 2011.

3GPP TS 36.133 V10.3.0, "3rd Generation Partnership Project; Technical Specification Group Radio Access Network; Evolved Universal Terrestrial Radio Access (E-UTRA); Requirements for support of radio resource management (Release 10)", Jun. 2011.

3GPP TS 36.213 V10.2.0, "3rd Generation Partnership Project; Technical Specification Group Radio Access Network; Evolved Universal Terrestrial Radio Access (E-UTRA); Physical layer procedures (Release 10)", Jun. 2011.

3GPP TS 36.300 V10.4.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10)", Jun. 2011.

International Search Report issued for corresponding International Patent Application No. PCT/JP2014/067282, mailed on Sep. 16, 2014, with an English translation.

* cited by examiner

| DCI_f0 | NDI VALUE | MCS VALUE |
|---|---|---|
| CELLULAR COMMUNICATION DCI | 0 (NEW) | 0 TO 28 |
| | 1 (RETRANSMISSION) | 29 TO 31 |
| D2D COMMUNICATION DCI | 0 (NEW) | 29 TO 31 |
| | 1 (RETRANSMISSION) | 0 TO 28 |

FIG.10

| FLAG | D2D COMMUNICATION DCI |

COMMUNICATION SYSTEM, BASE STATION, AND COMMUNICATION TERMINAL

CROSS-REFERENCE TO RELATED APPLICATION

This application is a continuation of International Application No. PCT/JP2014/067282, filed on Jun. 27, 2014, the entire contents of which are incorporated herein by reference.

FIELD

The embodiments discussed herein are related to a communication system, a base station, and a communication terminal.

BACKGROUND

Recently, a next-generation wireless communication technology has been studied to achieve, for example, an increase in the speed and capacity of wireless communication in a wireless communication system such as a cellular system as one of mobile phone systems. For example, following formulation of a communication standard called "Long Term Evolution (LTE)", the standards body of 3rd Generation Partnership Project (3GPP) has discussed about a communication standard called "LTE-Advanced (LTE-A)" to achieve further performance improvement on the basis of the wireless communication technology of LTE.

One of communication technologies that are likely to be introduced to LTE-A in the future and a basic technical discussion of which is currently carried out at 3GPP is direct communication between communication terminals called "device-to-device (D2D) communication". In the conventional cellular communication, communication terminals close to each other communicate (i.e. transmit user data to one another) through a base station. In the D2D communication, however, the communication terminals close to each other directly communicate without routing communication signal through a base station. The D2D communication allows communication between the communication terminals even when the base station is not in operation.

In the D2D communication discussion, it is assumed that the D2D communication and cellular communication share the same wireless resource (radio frequency band) allocated for UL communication of the cellular communication. The discussion has been also made on introduction of a communication terminal capable of performing both of the cellular communication and the D2D communication. Thus, when the D2D communication is performed by using the uplink radio frequency band for cellular communication, the base station performs, in an identical radio frequency band, both of allocation of an uplink wireless resource for cellular communication and allocation of a wireless resource for D2D communication to one communication terminal.

In the current LTE specifications, it is stipulated that layer 1 control information transmitted from the base station to the communication terminal is called "downlink control information (DCI)" and employs any one of Formats 0, 1, 1A, 1B, 1C, 1D, 2, 2A, 2B, 2C, 2D, 3, 3A, and 4 depending on its usage, in other words, the content of control information. For example, Format 0 or 4 is employed for DCI used when the base station notifies the communication terminal of an allocation result of a wireless resource to be used by the communication terminal to transmit a signal to the base station.

DCI is transmitted from the base station to the communication terminal through a "physical downlink control channel (PDCCH)" as one of wireless physical channels used in the LTE system. Each PDCCH is mapped to a wireless resource region including one or a plurality of continuous control channel elements (CCEs). The PDCCH employs any of Formats 0 to 3 depending on its size. The PDCCH in Format 0 has a size of "N" corresponding to "1CCE", and the PDCCH in Format 1 has a size of "2N" corresponding to "2CCE". The PDCCH in Format 2 has a size of "4N" corresponding to "4CCE", and the PDCCH in Format 3 has a size of "8N" corresponding to "8CCE". Thus, the sizes N, 2N, 4N, and 8N of the PDCCH correspond to the number of coupled CCEs, 1, 2, 4, and 8, respectively, where the number of coupled CCEs is called an "aggregation level".

DCI is encoded at a code rate in accordance with the quality of a downlink propagation channel, specifically, at a lower code rate as the quality of the downlink propagation channel decreases. Thus, the size of encoded DCI increases as the quality of the downlink propagation channel decreases. When the encoded DCI is transmitted through the PDCCH, the size of the encoded DCI is adjusted to match with any one of the four sizes N to 8N of the PDCCH through rate matching. Accordingly, the PDCCH having a larger size is used for DCI transmission as the quality of the downlink propagation channel decreases, and the aggregation level is selected from among 1, 2, 4, and 8 depending on the size of encoded DCI. A CCE modulation scheme is fixed by quadrature phase shift keying (QPSK) irrespective of the quality of the downlink propagation channel.

A wireless resource region to which a PDCCH for each communication terminal is mapped is called a "search space". As illustrated in FIG. 1, the search space is defined for each aggregation level. FIG. 1 is a diagram used for description of conventional search spaces. In FIG. 1, "SS" indicates the search space, and "AL" indicates the aggregation level. In the current LTE, for cellular communication, six search spaces SS0 to SS5 are defined depending on the aggregation level as illustrated in FIG. 1. Among search spaces SS0 to SS5, four search spaces SS0 to SS3 are unique to each communication terminal, and two search spaces SS4 to SS5 are common to all communication terminals.

In FIG. 1, SS0 at AL=1 includes six search units to which the PDCCH in Format 0 can be mapped, each search unit corresponding to 1CCE. SS1 at AL=2 includes six search units to which the PDCCH in Format 1 can be mapped, each search unit corresponding to 2CCE. SS2 at AL=4 includes two search units to which the PDCCH in Format 2 can be mapped, each search unit corresponding to 4CCE. SS3 at AL=8 includes two search units to which the PDCCH in Format 3 can be mapped, each search unit corresponding to 8CCE. SS4 at AL=4 includes four search units to which the PDCCH in Format 2 can be mapped, each search unit corresponding to 4CCE. SS5 at AL=8 includes two search units to which the PDCCH in Format 3 can be mapped, each search unit corresponding to 8CCE.

A 16-bit cyclic redundancy check (CRC) bit masked with a 16-bit string indicating the ID of a communication terminal at the destination of DCI is added to the DCI before encoding so as to identify the communication terminal. The communication terminal performs CRC by demasking a CRC bit part of a decoded bit string with the ID of the communication terminal, thereby detecting the DCI addressed to the communication terminal. In other words, the communication terminal determines that received DCI is the DCI addressed to the communication terminal if the CRC by demasking with the ID of the communication terminal is successful. Such detection of DCI by CRC using the ID of the communication terminal is also called "blind detection".

One subframe includes SS0 to SS3 for each communication terminal, and SS4 and SS5. The communication terminal performs blind detection for each search unit included in each search space. As illustrated in FIG. 1, the total number of search units in SS0 to SS5 is 22. The size of DCI before encoding varies with each format, and DCI has a size of two kinds. Thus, the communication terminal performs blind detection for each of DCI having a size of two kinds for each search unit. Accordingly, the number of times of blind detection performed in one subframe is 22×2=44 at maximum for each communication terminal.

Examples of related-art are described in: 3GPP TR 36.913, "Requirements for further advancements for Evolved Universal Terrestrial Radio Access (E-UTRA) (LTE-Advanced)", V9.0.0, Release 9, December 2009; 3GPP TR36.912, "Feasibility study for further advancements for E-UTRA (LTE-Advanced)", V9.3.0, Release 9, June 2010; 3GPP TS36.321, "Medium Access Control (MAC) protocol specification", V10.2.0, Release 10, June 2011; 3GPP TS36.133, "Requirements for support of radio resource management", V10.3.0, Release 10, June 2011; 3GPP TS36.213, "Physical layer procedures", V10.2.0, Release 10, June 2011; and 3GPP TS36.300, "Evolved Universal Terrestrial Radio Access (E-UTRA) and Evolved Universal Terrestrial Radio Access Network (E-UTRAN)", V10.4.0, Release 10, June 2011.

The current LTE defines no format for DCI used by a base station to notify a communication terminal of an allocation result of a D2D communication wireless resource. Thus, DCI in a new format can be introduced to notify an allocation result of a D2D communication wireless resource. However, the introduction of D2D communication DCI in a new format leads to an increase in the number of times of blind detection at the communication terminal.

FIG. 2 is a diagram used for description of a problem. In FIG. 2, "SS" indicates a search space, "AL" indicates an aggregation level, and a number in parentheses indicates the number of search units included in each search space. As described with reference to FIG. 1, the number of search units for cellular communication is 22 for each communication terminal. Conventionally, DCI has a size of two kinds, and thus the number of times of blind detection for cellular communication is 44 at maximum in one subframe for each communication terminal as described above. However, for example, when SS6 to SS9 are prepared for D2D communication DCI in a new format similarly to the conventional SS0 to SS3 prepared for each communication terminal, the number of times of blind detection for D2D communication is 6+6+2+2=16 at maximum in one subframe for each communication terminal. Accordingly, blind detection is performed 44+16=60 times at maximum in one subframe at a communication terminal capable of performing both of cellular communication and D2D communication. In other words, a processing amount for the blind detection increases by 36% approximately from the conventional processing amount. The increase in the number of times of blind detection results in an increase in electric power consumption of the communication terminal, and thus it is preferable to decrease the number of times of blind detection.

The technology disclosed in the present application is intended to solve the above-described problem, and it is an object of the disclosed technology to reduce an increase in electric power consumption at a communication terminal in D2D communication.

SUMMARY

According to an aspect of an embodiment, a communication system includes a base station, a first communication terminal, and a second communication terminal capable of communicating with the base station and directly communicating with the first communication terminal without routing communication signal through the base station, wherein the base station is configured to notify the second communication terminal of a wireless resource allocation result by using control information including a first region, a second region, and a third region, set the second region and the third region to have values in a first specific combination when notifying, by using the first region, the second communication terminal of a first allocation result of a first wireless resource allocated to communication between the base station and the second communication terminal, and set the second region and the third region to have values in a second specific combination different from the first specific combination when notifying, by using the first region, the second communication terminal of a second allocation result of a second wireless resource allocated to direct communication between the second communication terminal and the first communication terminal, and the second communication terminal is configured to detect the control information, communicate with the base station in accordance with the first allocation result indicated in the first region when having determined that the second region and the third region of the detected control information have values in the first specific combination, and directly communicate with the first communication terminal in accordance with the second allocation result indicated in the first region when having determined that the second region and the third region of the detected control information have values in the second specific combination.

According to another aspect of an embodiment, a base station configured to notify a second communication terminal of a wireless resource allocation result by using control information including a first region, a second region, and a third region, the second communication terminal being capable of communicating with the base station and directly communicating with a first communication terminal includes a first generation unit configured to generate the control information in which the second region and the third region have values in a first specific combination when notifying, by using the first region, the second communication terminal of a first allocation result of a first wireless resource allocated to communication between the base station and the second communication terminal, and a second generation unit configured to generate the control information in which the second region and the third region have values in a second specific combination different from the first specific combination when notifying, by using the first region, the second communication terminal of a second allocation result of a second wireless resource allocated to direct communication between the second communication terminal and the first communication terminal.

According to another aspect of an embodiment, a communication terminal capable of communicating with a base station configured to notify the communication terminal of a wireless resource allocation result by using control information including a first region, a second region, and a third region, and capable of directly communicating with another communication terminal without routing communication signal through the base station includes a detection unit configured to detect the control information, a determination unit configured to determine a combination of values in the second region and the third region of the detected control information, a first communication unit configured to communicate with the base station in accordance with an allocation result indicated in the first region when the combination is a first specific combination, and a second communication unit configured to directly communicate the other communication terminal in accordance with the allocation result indicated in the first region when the combination is a second specific combination different from the first specific combination.

According to another aspect of an embodiment, a communication system includes a base station, a first communication terminal, and a second communication terminal capable of communicating with the base station and directly communicating with the first communication terminal without routing communication signal through the base station, wherein the base station is configured to transmit, to the second communication terminal, integration of first control information for notifying the second communication terminal of a first allocation result of a first wireless resource allocated to direct communication between the second communication terminal and the first communication terminal, and predetermined information indicating whether second control information for notifying the second communication terminal of a second allocation result of a second wireless resource allocated to communication between the base station and the second communication terminal exists in a time slot allotted for transmission of the first control information, and the second communication terminal is configured to detect the first control information, and determine whether to perform detection of the second control information in the allotted time slot based on the predetermined information integrated with the first control information.

According to another aspect of an embodiment, a base station configured to notify a second communication terminal of a wireless resource allocation result, the second communication terminal being capable of communicating with the base station and directly communicating with a first communication terminal includes a generation unit configured to generate first control information for notifying the second communication terminal of a first allocation result of a first wireless resource allocated to direct communication between the second communication terminal and the first communication terminal, and predetermined information indicating whether second control information for notifying the second communication terminal of a second allocation result of a second wireless resource allocated to communication between the base station and the second communication terminal exists in a time slot allotted for transmission of the first control information, and a transmission unit configured to transmit integration of the first control information and the predetermined information to the second communication terminal.

According to still another aspect of an embodiment, a communication terminal capable of communicating with a base station configured to notify the communication terminal of a wireless resource allocation result and directly communicating with another communication terminal without routing communication signal through the base station includes a first detection unit configured to detect first control information for notifying the communication terminal of a first allocation result of a first wireless resource allocated to direct communication between the other communication terminal and the communication terminal, and a second detection unit configured to determine, based on predetermined information integrated with the first control information and indicating whether second control information for notifying the communication terminal of a second allocation result of a second wireless resource allocated to communication between the base station and the communication terminal exists in a time slot allotted for transmission of the first control information, whether to perform detection of the second control information in the allotted time slot.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 10 is a diagram illustrating an exemplary format of D2D communication DCI according to the second embodiment;

DESCRIPTION OF EMBODIMENTS

Figure 1:
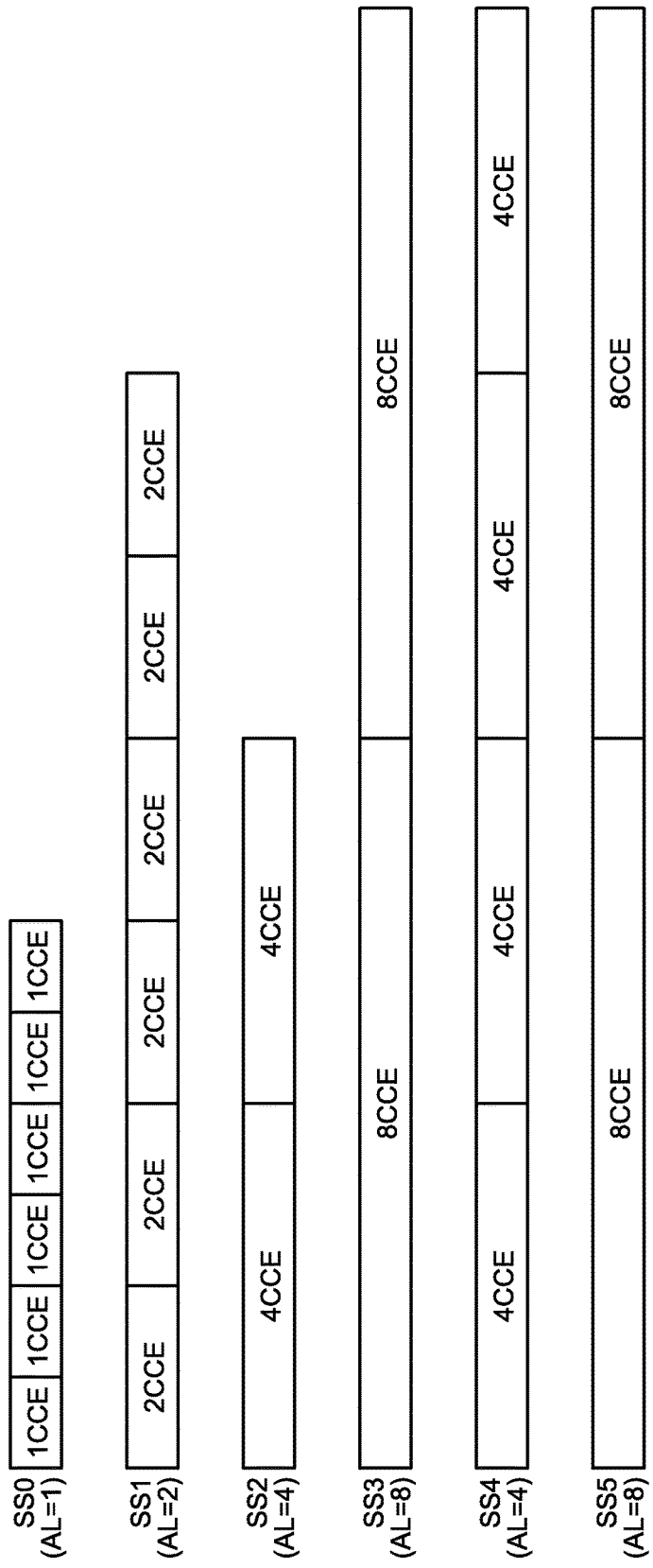
FIG. 1 is a diagram used for description of conventional search spaces.

Preferred embodiments of the present invention will be explained with reference to accompanying drawings. These embodiments are not intended to limit the communication system, the base station, and the communication terminal disclosed in the present application. Components having an identical function or steps of performing identical processing in the embodiments are denoted by an identical reference numeral, and any duplicate description thereof will be omitted in the following.

[a] First Embodiment

Configuration of Communication System

Figure 3:
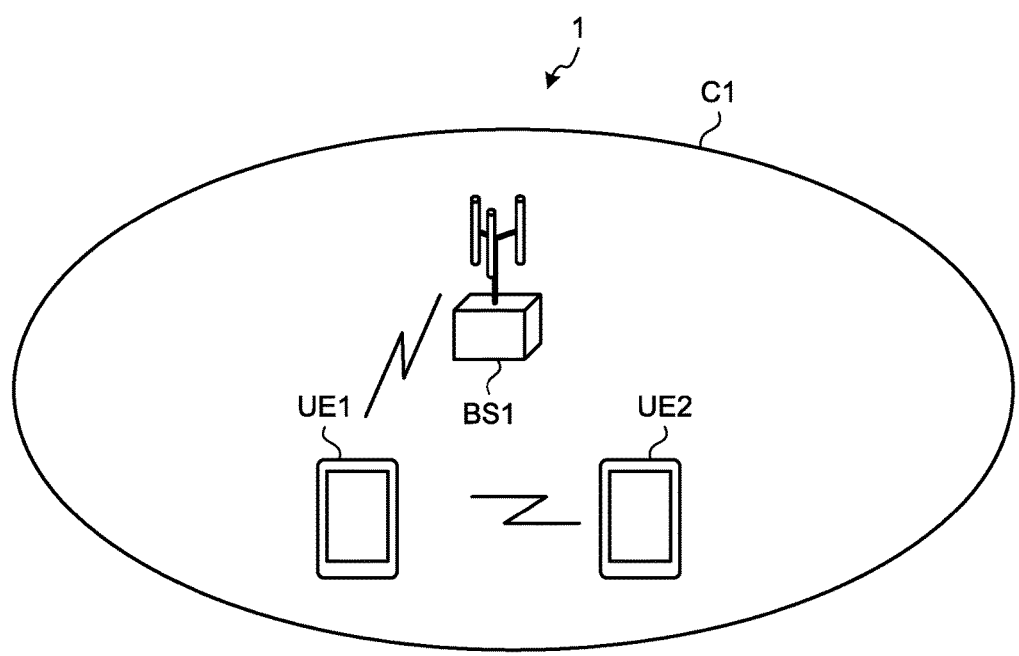
FIG. 3 is a diagram illustrating an exemplary configuration of a communication system according to a first embodiment.

FIG. 3 is a diagram illustrating an exemplary configuration of a communication system according to a first embodiment. In FIG. 3, this communication system 1 includes a base station BS1, a communication terminal UE1, and a communication terminal UE2 that are connected to a network (not illustrated). The communication terminal UE1 is capable of communicating with the base station BS1. The communication terminal UE1 is also capable of directly communicating with the communication terminal UE2 without routing communication signal through the base station BS1, in other words, performing D2D communication with the communication terminal UE2. In short, the communication terminal UE1 is capable of performing both of cellular communication and D2D communication. The base station BS1 provides a cell C1. The communication terminal UE1 receives DCI from the base station BS1 before performing cellular communication or D2D communication.

Configuration of Base Station

Figure 4:
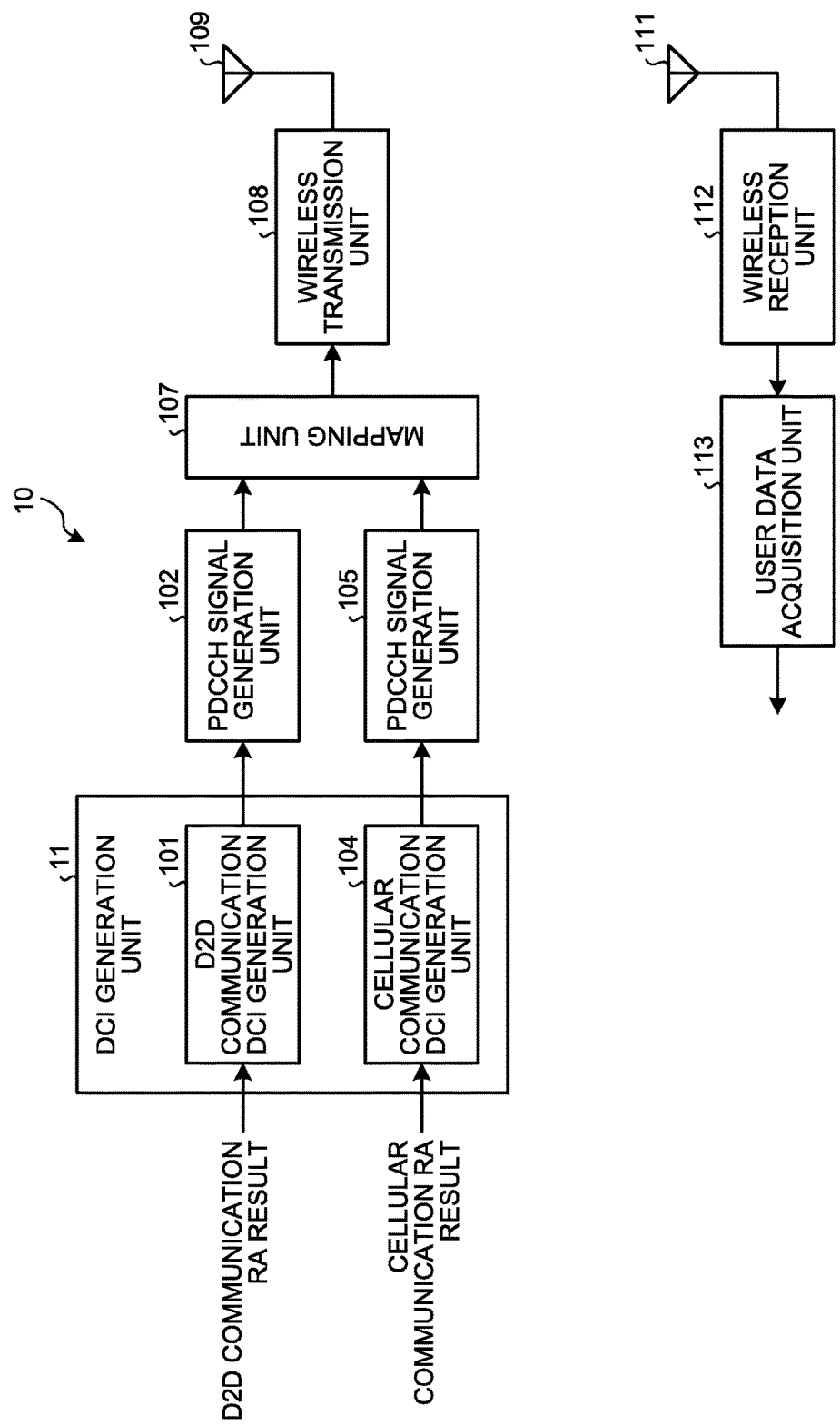
FIG. 4 is a functional block diagram illustrating an exemplary configuration of a base station according to the first embodiment.

FIG. 4 is a functional block diagram illustrating an exemplary configuration of a base station according to the first embodiment. This base station 10 illustrated in FIG. 4 corresponds to the base station BS1 illustrated in FIG. 3. In FIG. 4, the base station 10 includes a DCI generation unit 11, PDCCH signal generation units 102 and 105, a mapping unit 107, a wireless transmission unit 108, and a transmission antenna 109. The DCI generation unit 11 includes a D2D communication DCI generation unit 101 and a cellular communication DCI generation unit 104. The base station 10 includes a reception antenna 111, a wireless reception unit 112, and a user data acquisition unit 113.

The D2D communication DCI generation unit 101 receives an allocation result (hereinafter also referred to as a "D2D communication resource allocation (RA) result") of a wireless resource allocated to D2D communication between the communication terminal UE1 and the communication terminal UE2. The D2D communication DCI generation unit 101 generates D2D communication DCI indicating the D2D communication RA result in accordance with a specific format, and outputs the generated D2D communication DCI to the PDCCH signal generation unit 102.

The cellular communication DCI generation unit 104 receives an allocation result (hereinafter also referred to as a "cellular communication RA result") of a wireless resource allocated to cellular communication between the base station 10 and the communication terminal UE1. The cellular communication DCI generation unit 104 generates cellular communication DCI indicating the cellular communication RA result in accordance with a specific format, and outputs the generated cellular communication DCI to the PDCCH signal generation unit 105.

The D2D communication DCI generated by the D2D communication DCI generation unit 101 and the cellular communication DCI generated by the cellular communication DCI generation unit 104 employ an identical specific format. For example, the D2D communication DCI and the cellular communication DCI both employ the conventional Format 0.

Figure 5:
FIG. 5 is a diagram illustrating an exemplary format of DCI in Format 0.

FIG. 5 is a diagram illustrating an exemplary format of DCI in Format 0. As illustrated in FIG. 5, DCI in Format 0 includes a new data indicator (NDI) field, a resource allocation (RA) field, a modulation and coding scheme (MCS) field, and other fields. The RA field indicates an allocation result (hereinafter also referred to as an "RA result") of a wireless resource. The communication terminal can determine whether a wireless resource allocated by the base station is for new data transmission or data retransmission on the basis of a value indicated in the NDI field. The MCS field indicates an MCS level of a data signal transmitted from the communication terminal UE1, and the MCS level has, for example, any value of 0 to 31. A code rate and a modulation scheme (QPSK, 16QAM, or 64QAM, for example) indicated by the value of 0 to 31 are defined in, for example, a document of the 3GPP specifications. The D2D communication DCI and the cellular communication DCI employ, for example, Format 0 illustrated in FIG. 5. However, the D2D communication DCI and the cellular communication DCI have different combinations of a value in the NDI field (hereinafter also referred to as an "NDI value") and a value in the MCS field (hereinafter also referred to as an "MCS value"). The D2D communication DCI and the cellular communication DCI will be described later in detail.

The PDCCH signal generation unit 102 provides the D2D communication DCI with encoding processing and modulation processing to generate a D2D communication PDCCH signal, and outputs the generated PDCCH signal to the mapping unit 107.

The PDCCH signal generation unit 105 provides the cellular communication DCI with encoding processing and modulation processing to generate a cellular communication PDCCH signal, and outputs the generated PDCCH signal to the mapping unit 107.

The PDCCH signal generation units 102 and 105 encode DCI addressed to the communication terminal UE1 after adding a CRC bit masked with a bit string indicating an ID of the communication terminal UE1 to the DCI. The PDCCH signal generation units 102 and 105 encode the DCI at a lower code rate as the quality of a downlink propagation channel to the communication terminal UE1 decreases. The PDCCH signal generation units 102 and 105 perform the same encoding processing on DCI addressed to a communication terminal other than the communication terminal UE1.

The mapping unit 107 maps the D2D communication PDCCH signal to search units of any one of search spaces SS0 to SS3 illustrated in FIG. 1, and outputs the D2D communication PDCCH signal to the wireless transmission unit 108. The mapping unit 107 maps the cellular communication PDCCH signal to search units of any one of search spaces SS0 to SS5 illustrated in FIG. 1, and outputs the cellular communication PDCCH signal to the wireless transmission unit 108. The D2D communication PDCCH signal and the cellular communication PDCCH signal are mapped to search units different from each other.

The wireless transmission unit 108 obtains a wireless signal by performing digital-to-analog conversion, up-conversion, and the like on a baseband of the PDCCH signal, and transmits the wireless signal to the communication terminal UE1 through the transmission antenna 109. The communication terminal UE1 is notified of the D2D communication DCI and the cellular communication DCI through this transmission of the wireless signal.

The wireless reception unit 112 obtains a baseband signal by performing down-conversion, analog-to-digital conversion, and the like on the wireless signal received from the communication terminal UE1 through the reception antenna 111, and outputs the baseband signal to the user data acquisition unit 113.

The user data acquisition unit 113 extracts a data signal from the baseband signal in accordance with a result of mapping to an uplink (UL) signal at the communication terminal UE1, and provides the extracted data signal with demodulation processing and decoding processing to acquire user data. Since the mapping to the UL signal at the communication terminal UE1 is performed in accordance with the cellular communication DCI, the user data acquisition unit 113 can acquire the result of mapping to the UL signal on the basis of the cellular communication RA result input to the DCI generation unit 11.

Configuration of Communication Terminal

Figure 6:
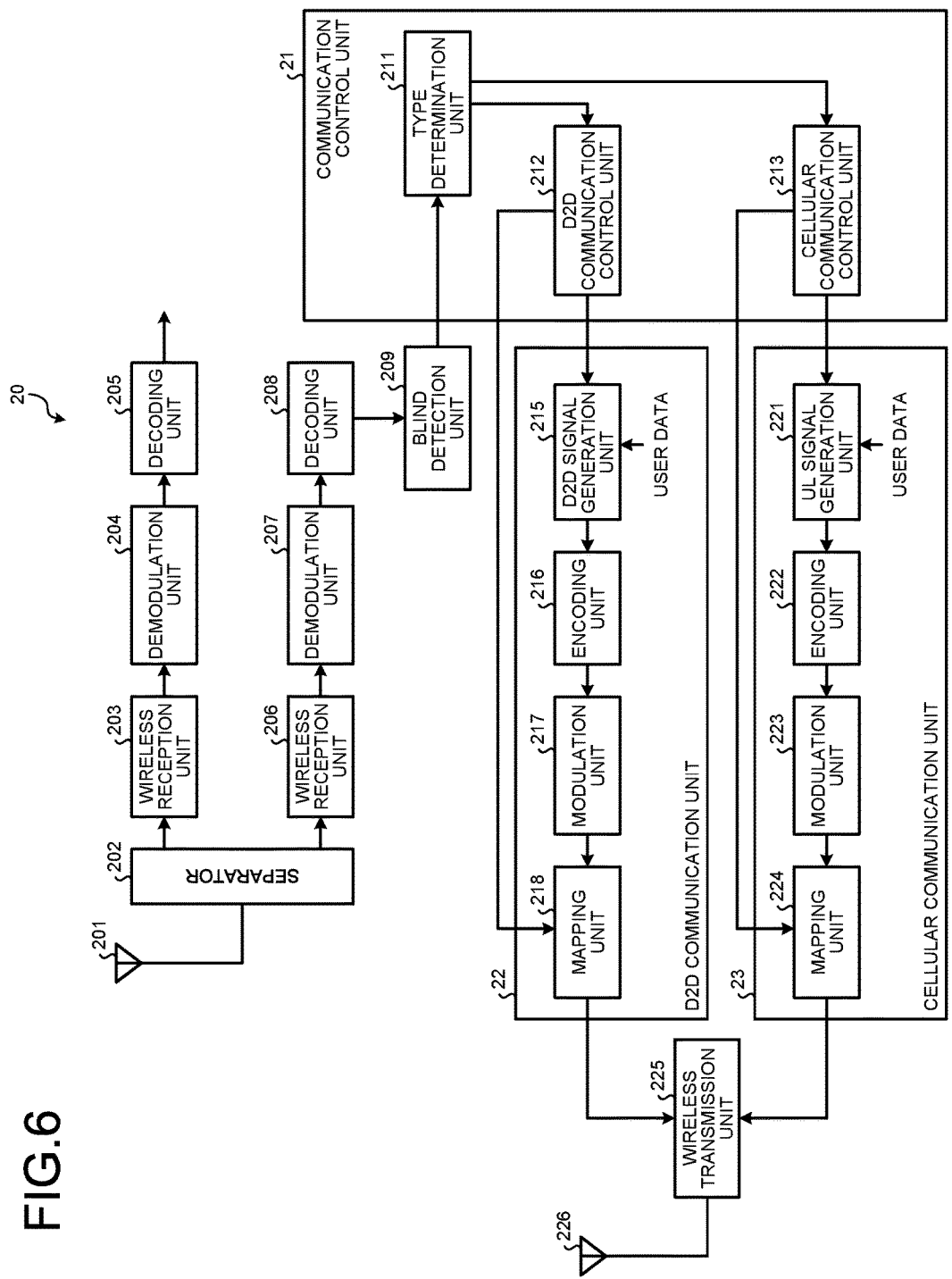
FIG. 6 is a functional block diagram illustrating an exemplary configuration of a communication terminal according to the first embodiment.

FIG. 6 is a functional block diagram illustrating an exemplary configuration of a communication terminal according to the first embodiment. This communication terminal 20 illustrated in FIG. 6 corresponds to the communication terminal UE1 illustrated in FIG. 3. In FIG. 6, the communication terminal 20 includes a reception antenna 201, a separator 202, wireless reception units 203 and 206, demodulation units 204 and 207, decoding units 205 and 208, a blind detection unit 209, and a communication control unit 21. The communication control unit 21 includes a type determination unit 211, a D2D communication control unit 212, and a cellular communication control unit 213. The communication terminal 20 includes a D2D communication unit 22, a cellular communication unit 23, a wireless transmission unit 225, and a transmission antenna 226. The D2D communication unit 22 includes a D2D signal generation unit 215, an encoding unit 216, a modulation unit 217, and a mapping unit 218. The cellular communication unit 23 includes an UL signal generation unit 221, an encoding unit 222, a modulation unit 223, and a mapping unit 224.

The separator 202 separates a wireless signal received through the reception antenna 201 into a wireless signal from the communication terminal UE2 and a wireless signal from the base station BS1. The separator 202 then outputs the wireless signal received from the communication terminal UE2 to the wireless reception unit 203 and outputs the wireless signal received from the base station BS1 to the wireless reception unit 206.

The wireless reception unit 203 performs down-conversion, analog-to-digital conversion, and the like on the wireless signal from the communication terminal UE2 to obtain a baseband signal, and outputs the obtained baseband signal to the demodulation unit 204.

The demodulation unit 204 performs demodulation processing on the baseband signal input from the wireless reception unit 203, and outputs the demodulated signal to the decoding unit 205.

The decoding unit 205 performs decoding processing on the signal input from the demodulation unit 204. The decoding processing at the decoding unit 205 obtains data transmitted from the communication terminal UE2.

The wireless reception unit 206 performs down-conversion, analog-to-digital conversion, and the like on the wireless signal from the base station BS1 to obtain a baseband PDCCH signal, and outputs the obtained baseband PDCCH signal to the demodulation unit 207.

The demodulation unit 207 performs demodulation processing on the PDCCH signal input from the wireless reception unit 206, and outputs the demodulated PDCCH signal to the decoding unit 208.

The decoding unit 208 performs decoding processing on the PDCCH signal input from the demodulation unit 207. The decoding processing at the decoding unit 208 obtains a plurality of pieces of DCI transmitted from the base station BS1. These pieces of DCI include DCI addressed to the communication terminal 20 and DCI addressed to a communication terminal other than the communication terminal 20. A CRC bit masked with a bit string indicating an ID of each communication terminal is added to each piece of DCI. The decoding unit 208 outputs a bit string obtained by the decoding, in other words, the DCI to which the CRC bit is added, to the blind detection unit 209.

The blind detection unit 209 performs blind detection for each search unit of each of search spaces SS0 to SS5 illustrated in FIG. 1 so as to detect DCI addressed to the communication terminal 20, and outputs the detected DCI to the type determination unit 211.

The type determination unit 211 determines the type of the DCI detected through the blind detection. The type of DCI is D2D communication DCI or cellular communication DCI. The type determination unit 211 determines whether the detected DCI is the D2D communication DCI or the cellular communication DCI on the basis of a combination of the NDI value and the MCS value in the detected DCI. When having determined that the detected DCI is D2D communication DCI, the type determination unit 211 outputs, to the D2D communication control unit 212, the DCI input from the blind detection unit 209. When having determined that the detected DCI is cellular communication DCI, the type determination unit 211 outputs, to the cellular communication control unit 213, the DCI input from the blind detection unit 209. Accordingly, the D2D communication DCI is input to the D2D communication control unit 212, and the cellular communication DCI is input to the cellular communication control unit 213. This determination processing at the type determination unit 211 will be described in detail later.

The D2D communication control unit 212 notifies the mapping unit 218 of an RA result indicated in the RA field of the D2D communication DCI. Having received DCI from the type determination unit 211, the D2D communication control unit 212 transmits a signal generation instruction to the D2D signal generation unit 215.

Having received the signal generation instruction from the D2D communication control unit 212, the D2D signal generation unit 215 converts user data addressed to the communication terminal UE2 into a predetermined signal format of D2D communication to generate a D2D signal, and outputs the generated D2D signal to the encoding unit 216.

The encoding unit 216 encodes the D2D signal and outputs the encoded D2D signal to the modulation unit 217.

The modulation unit 217 modulates the encoded D2D signal and outputs the modulated D2D signal to the mapping unit 218.

The mapping unit 218 maps the D2D signal to a wireless communication resource indicated by the RA result notified by the D2D communication control unit 212, and outputs the D2D signal to the wireless transmission unit 225.

The cellular communication control unit 213 notifies the mapping unit 224 of an RA result indicated in the RA field of the cellular communication DCI. Having received DCI from the type determination unit 211, the cellular communication control unit 213 transmits a signal generation instruction to the UL signal generation unit 221.

Having received the signal generation instruction from the cellular communication control unit 213, the UL signal generation unit 221 converts user data addressed to the base station BS1 into a predetermined UL signal format to generate an UL signal, and outputs the generated UL signal to the encoding unit 222.

The encoding unit 222 encodes the UL signal and outputs the encoded UL signal to the modulation unit 223.

The modulation unit 223 modulates the encoded UL signal and outputs the modulated UL signal to the mapping unit 224.

The mapping unit 224 maps the UL signal to a wireless communication resource indicated by the RA result notified by the cellular communication control unit 213, and outputs the UL signal to the wireless transmission unit 225.

The wireless transmission unit 225 performs digital-to-analog conversion, up-conversion, and the like on the baseband of the D2D signal and the baseband of the UL signal to obtain wireless signals, and transmits the wireless signals to the communication terminal UE2 and the base station BS1, respectively, through the transmission antenna 226.

Operation of Base Station and Communication Terminal

Figures 7, 8:
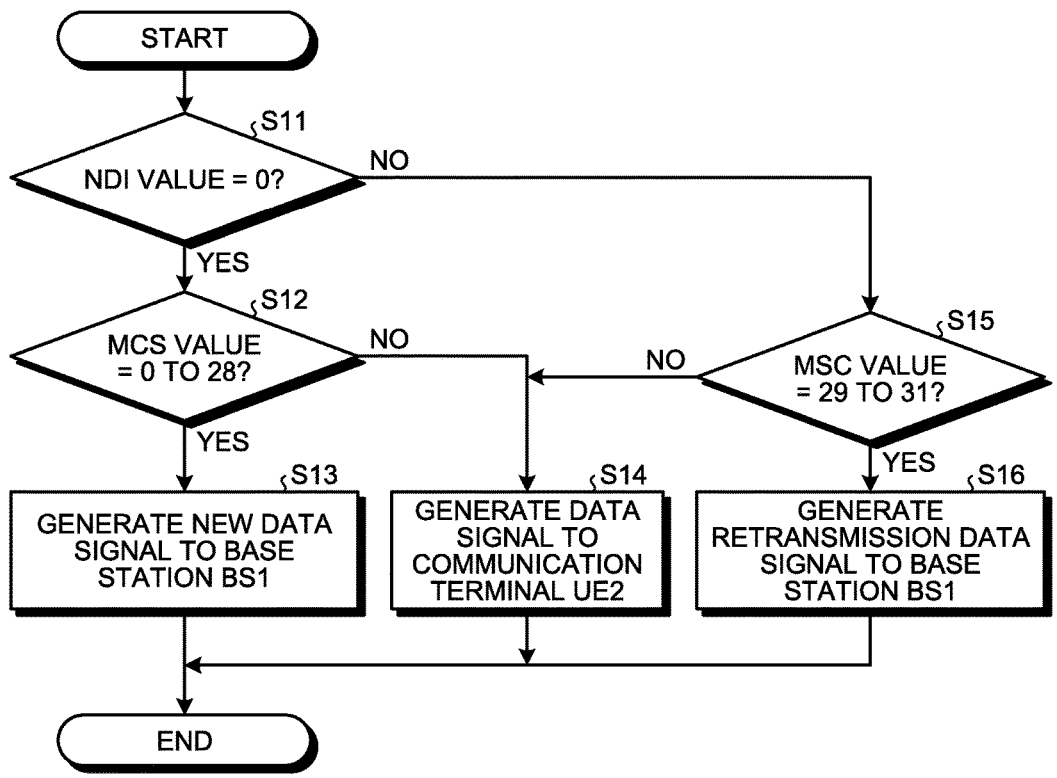
FIG. 7 is a diagram used for description of operation of the base station and the communication terminal according to the first embodiment.
FIG. 8 is a flowchart used for description of processing at the communication terminal according to the first embodiment.

FIG. 7 is a diagram used for description of operation of the base station and the communication terminal according to the first embodiment. FIG. 7 illustrates exemplary combinations of the NDI value and the MCS value in DCI in Format 0 (DCI_f0).

Specifically, when the DCI in Format 0 is used as cellular communication DCI, the base station 10 sets a first specific combination of the NDI value and the MCS value of the DCI in Format 0 as described below. The first specific combination is, for example, the following combination A or B. In combination A, the NDI value is "0" (new) and the MCS value is any value of 0 to 28. In combination B, the NDI value is "1" (retransmission) and the MCS value is any value of 29 to 31.

When the DCI in Format 0 is used as D2D communication DCI, the base station 10 sets a second specific combination of the NDI value and the MCS value of the DCI in Format 0 as described below. The second specific combination is, for example, the following combination C or D. In combination C, the NDI value is "0" (new) and the MCS value is any value of 29 to 31. In combination D, the NDI value is "1" (retransmission) and the MCS value is any value of 0 to 28. The second specific combination is a new combination not defined in the current LTE, and is different from the first specific combination. In other words, the second specific combination is a combination other than the first specific combination.

In the base station 10, the D2D communication DCI generation unit 101 generates D2D communication DCI by setting a D2D communication RA result to the RA field of DCI having the second specific combination. The cellular communication DCI generation unit 104 generates cellular communication DCI by setting a cellular communication RA result to the RA field of DCI having the first specific combination.

In the communication terminal 20, the type determination unit 211 determines whether DCI detected through blind detection is cellular communication DCI or D2D communication DCI on the basis of a combination of the NDI value and the MCS value of the DCI detected through blind detection. The DCI detected through blind detection is DCI in Format 0.

Specifically, when the NDI value and the MCS value of the DCI detected through blind detection are in the first specific combination, the type determination unit 211 determines that the DCI detected through blind detection is cellular communication DCI.

When the NDI value and the MCS value of the DCI detected through blind detection are in the second specific combination, the type determination unit 211 determines that the DCI detected through blind detection is D2D communication DCI.

In this manner, in the first embodiment, identical pieces of DCI in Format 0 can be each used as cellular communication DCI and D2D communication DCI depending on a combination of the NDI value and the MCS value.

The MCS value of D2D communication DCI does not necessarily need to indicate the MCS level. For example, in D2D communication DCI, the MCS value of 29 may indicate that one unit of a wireless resource is allocated to D2D communication, and the MCS value of 30 may indicate that a plurality of continuous or periodic units of a wireless resource are allocated to D2D communication. For example, in D2D communication DCI, the MCS value of 31 may indicate that a wireless resource notified by using the MCS value of 30 is canceled.

Processing at Communication Terminal

FIG. 8 is a flowchart used for description of processing at the communication terminal according to the first embodiment. The processing of the flowchart is started when DCI detected through blind detection is input to the type determination unit 211.

The type determination unit 211 determines whether the NDI value of the DCI detected through blind detection is "0" (new) (step S11).

If the NDI value is "0" (new) (Yes at step S11), the type determination unit 211 determines whether the MCS value of the DCI detected through blind detection is any value of 0 to 28 (step S12).

If the NDI value is not "0" (new), that is, the NDI value is "1" (retransmission) (No at step S11), the type determination unit 211 determines whether the MCS value of the DCI detected through blind detection is any value of 29 to 31 (step S15).

If the NDI value is "0" (new) (Yes at step S11) and the MCS value is any value of 0 to 28 (Yes at step S12), the UL signal generation unit 221 generates a new data signal to the base station BS1 as an UL signal (step S13).

If the NDI value is "1" (retransmission) (No at step S11) and the MCS value is any value of 29 to 31 (Yes at step S15), the UL signal generation unit 221 generates a retransmission data signal to the base station BS1 as an UL signal (step S16).

If the NDI value is "0" (new) (Yes at step S11) and the MCS value is not any value of 0 to 28, that is, the MCS value is any value of 29 to 31 (No at step S12), the D2D signal generation unit 215 generates a data signal to the communication terminal UE2 (step S14).

If the NDI value is "1" (retransmission) (No at step S11) and the MCS value is not any value of 29 to 31, that is, the MCS value is any value of 0 to 28 (No at step S15), the D2D signal generation unit 215 generates a data signal to the communication terminal UE2 (step S14).

As described above, in the first embodiment, the communication system 1 includes the base station BS1, the communication terminal UE1, and the communication terminal UE2. The communication terminal UE1 is capable of performing cellular communication with the base station BS1 and performing D2D communication with the communication terminal UE2 without routing communication signal through the base station BS1.

The base station BS1 notifies the communication terminal UE1 of an RA result by using DCI including the RA field, the NDI field, and the MCS field. When notifying the communication terminal UE1 of the cellular communication RA result through the RA field, the base station BS1 sets the first specific combination of the NDI value and the MCS value. When notifying the communication terminal UE1 of a D2D communication RA result through the RA field, the base station BS1 sets the second specific combination of the NDI value and the MCS value, which is different from the first specific combination.

In response to the notification, the communication terminal UE1 detects the DCI from the base station BS1. When having determined that the NDI value and the MCS value of the detected DCI are in the first specific combination, the communication terminal UE1 performs cellular communication with the base station BS1 in accordance with the RA result indicated in the RA field. When having determined that the NDI value and the MCS value of the detected DCI are in the second specific combination, the communication terminal UE1 performs D2D communication with the communication terminal UE2 in accordance with the RA result indicated in the RA field.

The base station 10 notifies the communication terminal 20 of an RA result by using DCI including the RA field, the NDI field, and the MCS field, the communication terminal 20 being capable of communicating with the base station 10 and performing D2D communication with the communication terminal UE2. The base station 10 includes the cellular communication DCI generation unit 104 and the D2D communication DCI generation unit 101. When notifying the communication terminal 20 of the cellular communication RA result through the RA field, the cellular communication DCI generation unit 104 generates DCI having the NDI value and the MCS value in the first specific combination. When notifying the communication terminal 20 of a D2D communication RA result through the RA field, the D2D communication DCI generation unit 101 generates DCI having the NDI value and the MCS value in the second specific combination different from the first specific combination.

The communication terminal 20 is capable of performing cellular communication with the base station 10 configured to notify the communication terminal 20 of a RA result by using DCI including the RA field, the NDI field, and the MCS field, and is capable of performing D2D communication with the communication terminal UE2 without routing communication signal through the base station 10. The communication terminal 20 includes the blind detection unit 209, the type determination unit 211, the cellular communication unit 23, and the D2D communication unit 22. The blind detection unit 209 detects DCI addressed to the communication terminal 20. The type determination unit 211 determines a combination of the NDI value and the MCS value of the detected DCI. If the NDI value and the MCS value are in the first specific combination, the cellular communication unit 23 performs cellular communication with the base station 10 in accordance with the RA result indicated in the RA field. If the NDI value and the MCS value are in the second specific combination different from the first specific combination, the D2D communication unit 22 performs D2D communication with the communication terminal UE2 in accordance with the RA result indicated in the RA field.

In this manner, it is possible to notify the communication terminal UE1 (communication terminal 20) of a D2D communication RA result by using DCI in an existing format (for example, Format 0) as D2D communication DCI, without introducing D2D communication DCI in a new format. When DCI in an existing format is used as D2D communication DCI, an identical format size can be used for both of cellular communication DCI and D2D communication DCI. This eliminates the need to prepare a new search space for D2D communication DCI in a new format, and thus a maximum number of times of blind detection in one subframe at the communication terminal UE1 is maintained at a number of times identical to that (for example, 44 times) in the conventional technology. Thus, according to the first embodiment, it is possible to notify the communication terminal UE1 of a D2D communication RA result without increasing the number of times of blind detection from that in the conventional technology, and thus to reduce an increase in electric power consumption at the communication terminal UE1 in D2D communication. The first specific combination and the second specific combination are different from each other, and thus the communication terminal UE1 can reliably determine whether detected DCI is cellular communication DCI or D2D communication DCI.

According to the first embodiment, the first specific combination has the NDI value of "0" (new data) and the MCS value of "0 to 28" or has the NDI value of "1" (retransmission data) and the MCS value of "29 to 31". The second specific combination has the NDI value of "1" (retransmission data) and the MCS value of "0 to 28" or has the NDI value of "0" (new data) and the MCS value of "29 to 31".

With this configuration, among a plurality of combinations of the NDI value and the MCS value, a combination that does not exist in the existing first specific combination can be set as the new second specific combination, which facilitates definition of the second specific combination different from the first specific combination.

[b] Second Embodiment

Configuration of Communication System

A communication system according to a second embodiment has a configuration identical to that in the first embodiment, and thus description thereof is omitted.

Configuration of Base Station

Figure 9:
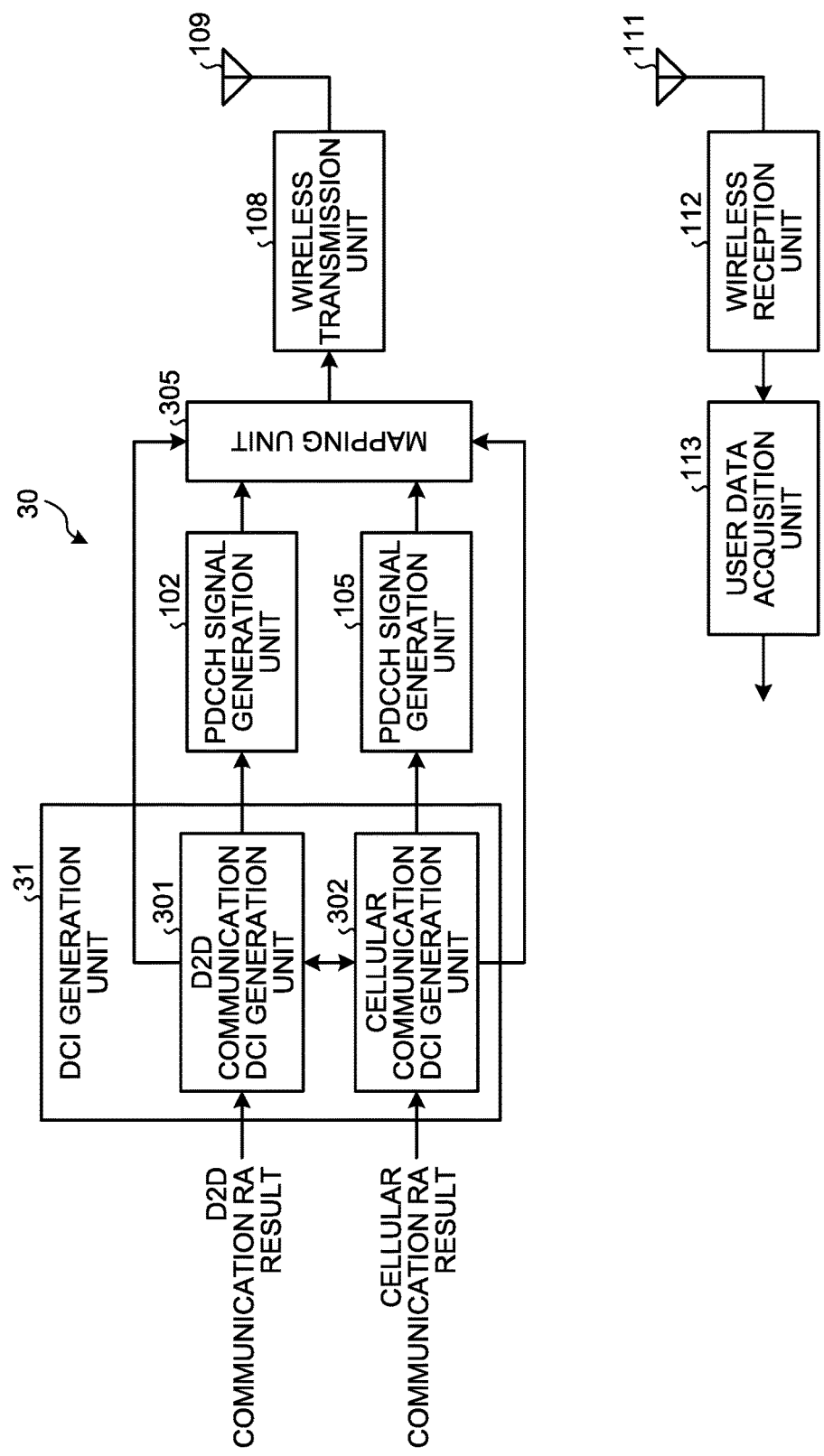
FIG. 9 is a functional block diagram illustrating an exemplary configuration of a base station according to a second embodiment.

FIG. 9 is a functional block diagram illustrating an exemplary configuration of a base station according to the second embodiment. This base station 30 illustrated in FIG. 9 corresponds to the base station BS1 illustrated in FIG. 3. In FIG. 9, the base station 30 includes a DCI generation unit 31, the PDCCH signal generation units 102 and 105, a mapping unit 305, the wireless transmission unit 108, and the transmission antenna 109. The DCI generation unit 31 includes a D2D communication DCI generation unit 301 and a cellular communication DCI generation unit 302. The base station 30 includes the reception antenna 111, the wireless reception unit 112, and the user data acquisition unit 113.

The D2D communication DCI generation unit 301 receives a D2D communication RA result. Having received the D2D communication RA result, in other words, having a D2D communication RA result to be transmitted to the communication terminal UE1, the D2D communication DCI generation unit 301 determines whether subframe #k to be transmitted next among sequentially transmitted subframes 0 to 9 has an available resource. The D2D communication DCI generation unit 301 sequentially performs this determination on subframes 0 to 9. Then, the D2D communication DCI generation unit 301 notifies the mapping unit 305 of subframe #x having an available resource, generates D2D communication DCI indicating the D2D communication RA result, and outputs the generated D2D communication DCI to the PDCCH signal generation unit 102.

The cellular communication DCI generation unit 302 receives a cellular communication RA result. Having received the cellular communication RA result, in other words, having a cellular communication RA result to be transmitted to the communication terminal UE1, the cellular communication DCI generation unit 302 determines whether subframe #k to be transmitted next among sequentially transmitted subframes 0 to 9 has an available resource. The cellular communication DCI generation unit 302 sequentially performs this determination on subframes 0 to 9. Then, the cellular communication DCI generation unit 302 notifies the mapping unit 305 of subframe #y having an available resource, generates cellular communication DCI indicating the cellular communication RA result, and outputs the generated cellular communication DCI to the PDCCH signal generation unit 105.

The cellular communication DCI generation unit 302 also notifies the D2D communication DCI generation unit 301 of subframe #y having an available resource. The D2D communication DCI generation unit 301 determines whether subframe #x and subframe #y match with each other, in other words, whether the D2D communication DCI and the cellular communication DCI are to be transmitted in an identical subframe. Then, the D2D communication DCI generation unit 301 generates a flag illustrated in FIG. 10 depending on a result of this determination, and adds the flag to the D2D communication DCI. FIG. 10 is a diagram illustrating an exemplary format of D2D communication DCI according to the second embodiment.

If subframe #x and subframe #y do not match with each other, the D2D communication DCI generation unit 301 determines that the D2D communication DCI and the cellular communication DCI are to be transmitted in different subframes. If it is determined that the D2D communication DCI and the cellular communication DCI are to be transmitted in different subframes, in other words, if it is determined that the cellular communication DCI is not to be transmitted in a subframe in which the D2D communication DCI is transmitted, the D2D communication DCI generation unit 301 generates the flag with a value of "0".

If subframe #x and subframe #y match with each other, the D2D communication DCI generation unit 301 determines that the D2D communication DCI and the cellular communication DCI are to be transmitted in an identical subframe. If it is determined that the D2D communication DCI and the cellular communication DCI are transmitted in an identical subframe, in other words, if it is determined that the cellular communication DCI is to be transmitted in a subframe in which the D2D communication DCI is transmitted, the D2D communication DCI generation unit 301 generates the flag with a value of "1".

A subframe corresponds to one unit time slot allotted for transmission of DCI. Thus, the flag generated depending on a result of the determination of whether the D2D communication DCI and the cellular communication DCI are to be transmitted in an identical subframe corresponds to predetermined information indicating whether the cellular communication DCI exists in an allotted time slot of the D2D communication DCI.

Figure 2:
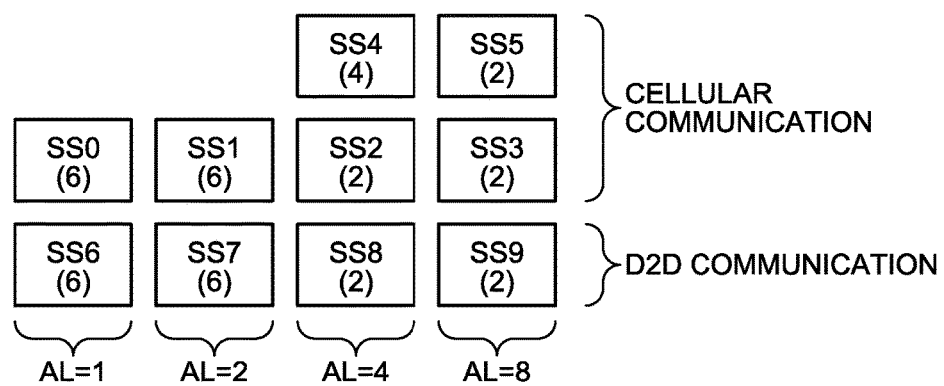
FIG. 2 is a diagram used for description of the above-described problem.

In subframe #x notified by the D2D communication DCI generation unit 301, the mapping unit 305 maps a D2D communication PDCCH signal to search units of any one of search spaces SS6 to SS9 illustrated in FIG. 2, and outputs the D2D communication PDCCH signal to the wireless transmission unit 108. In subframe #y notified by the cellular communication DCI generation unit 302, the mapping unit 305 maps a cellular communication PDCCH signal to search units of any one of search spaces SS0 to SS5 illustrated in FIG. 2, and outputs the cellular communication PDCCH signal to the wireless transmission unit 108.

The wireless transmission unit 108 performs digital-to-analog conversion, up-conversion, and the like on a baseband PDCCH signal to obtain a wireless signal, and transmits the obtained wireless signal to the communication terminal UE1 through the transmission antenna 109. The communication terminal UE1 is notified of the D2D communication DCI and the cellular communication DCI through this transmission of the wireless signal. As illustrated in FIG. 10, the flag with a value of "0" or "1" is added to the D2D communication DCI, and thus the communication terminal UE1 is notified of integration of the D2D communication DCI and the flag through this transmission of the wireless signal.

Configuration of Communication Terminal

Figure 11:
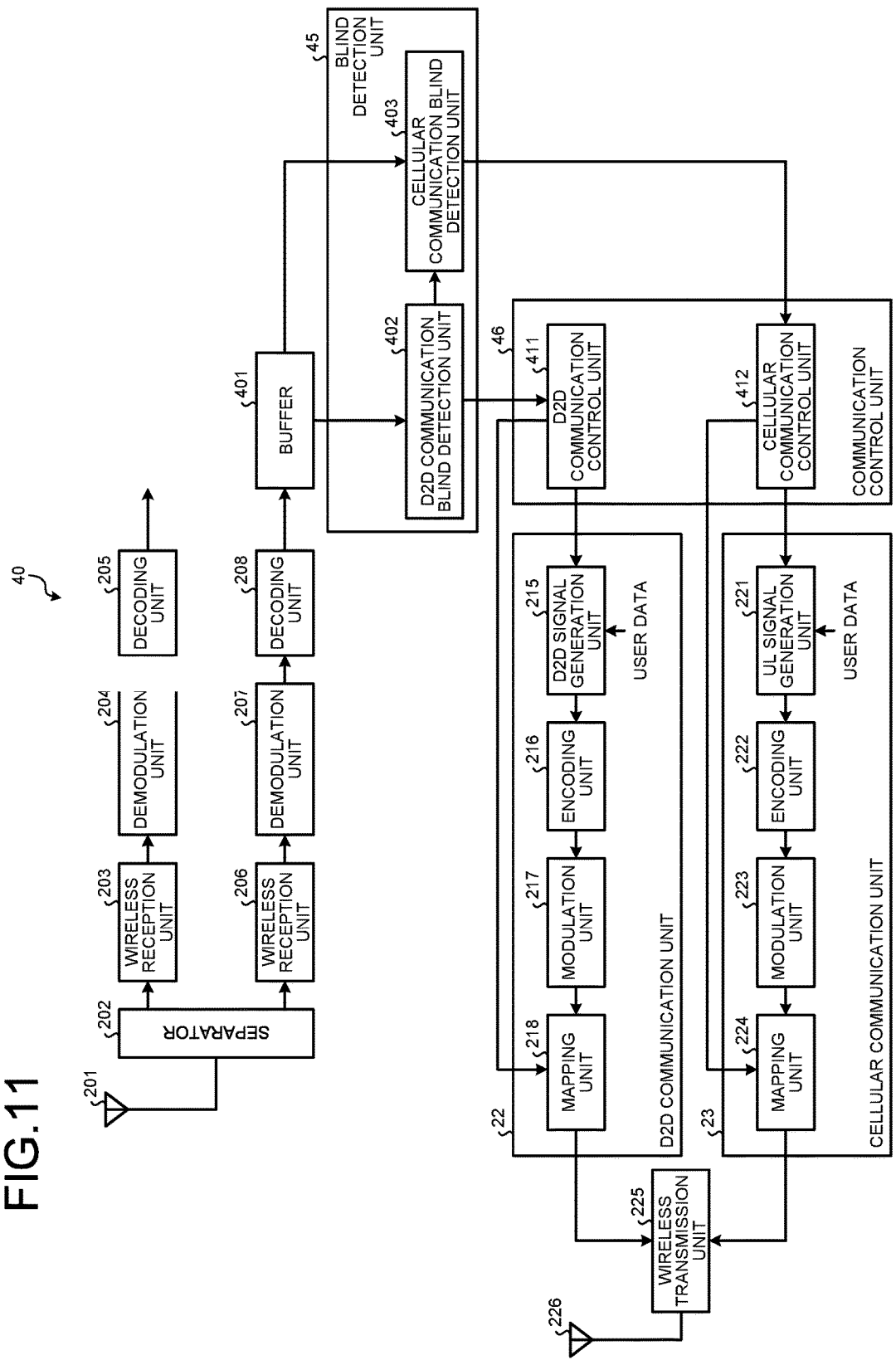
FIG. 11 is a functional block diagram illustrating an exemplary configuration of a communication terminal according to the second embodiment.

FIG. 11 is a functional block diagram illustrating an exemplary configuration of a communication terminal according to the second embodiment. This communication terminal 40 illustrated in FIG. 11 corresponds to the communication terminal UE1 illustrated in FIG. 3. In FIG. 11, the communication terminal 40 includes the reception antenna 201, the separator 202, the wireless reception units 203 and 206, the demodulation units 204 and 207, the decoding units 205 and 208, a buffer 401, and a blind detection unit 45. The blind detection unit 45 includes a D2D communication blind detection unit 402 and a cellular communication blind detection unit 403. The communication terminal 40 includes a communication control unit 46, the D2D communication unit 22, the cellular communication unit 23, the wireless transmission unit 225, and the transmission antenna 226. The communication control unit 46 includes a D2D communication control unit 411 and a cellular communication control unit 412. The D2D communication unit 22 includes the D2D signal generation unit 215, the encoding unit 216, the modulation unit 217, and the mapping unit 218. The cellular communication unit 23 includes the UL signal generation unit 221, the encoding unit 222, the modulation unit 223, and the mapping unit 224.

The decoding unit 208 performs decoding processing on a PDCCH signal input from the demodulation unit 207. The decoding processing at the decoding unit 208 obtains a plurality of pieces of DCI transmitted from the base station BS1. These pieces of DCI include DCI addressed to the communication terminal 40 and DCI addressed to a communication terminal other than the communication terminal 40. A CRC bit masked with a bit string indicating an ID of each communication terminal is added to each piece of DCI. The decoding unit 208 outputs a bit string obtained by the decoding, in other words, the DCI to which the CRC bit is added, to the buffer 401.

The buffer 401 temporarily stores therein the pieces of DCI output from the decoding unit 208 for each of subframes 0 to 9.

The D2D communication blind detection unit 402 refers to the buffer 401 and performs blind detection for each search unit of each of search spaces SS6 to SS9 (FIG. 2) in each of subframes 0 to 9.

When having detected D2D communication DCI addressed to the communication terminal 40 through the blind detection, the D2D communication blind detection unit 402 acquires a flag added to the detected D2D communication DCI and outputs the detected D2D communication DCI to the D2D communication control unit 411. Simultaneously, the D2D communication blind detection unit 402 outputs the acquired flag to the cellular communication blind detection unit 403, associates the flag with subframe #a in which the D2D communication DCI with the flag is detected, and notifies the cellular communication blind detection unit 403 of the subframe.

When having detected no D2D communication DCI addressed to the communication terminal 40 through the blind detection, the D2D communication blind detection unit 402 notifies the cellular communication blind detection unit 403 of subframe #b in which no D2D communication DCI is detected. No flag is acquired when no D2D communication DCI is detected, and thus no flag is associated with subframe #b.

The cellular communication blind detection unit 403 determines whether to perform the blind detection of cellular communication DCI in subframe #a on the basis of the value of the flag input from the D2D communication blind detection unit 402.

If the value of the flag associated with subframe #a is "0", the cellular communication blind detection unit 403 determines that the blind detection of cellular communication DCI is not to be performed in subframe #a. Thus, when the value of the flag is "0", the cellular communication blind detection unit 403 does not perform the blind detection of cellular communication DCI in subframe #a.

If the value of the flag associated with subframe #a is "1", the cellular communication blind detection unit 403 determines that the blind detection of cellular communication DCI is to be performed in subframe #a. Thus, when the value of the flag is "1", the cellular communication blind detection unit 403 refers to the buffer 401 and performs the blind detection of cellular communication DCI in subframe #a. Then, the cellular communication blind detection unit 403 detects cellular communication DCI addressed to the communication terminal 40 through the blind detection, and outputs the detected cellular communication DCI to the cellular communication control unit 412.

For subframe #b associated with no flag, the cellular communication blind detection unit 403 refers to the buffer 401 and performs the blind detection of cellular communication DCI in subframe #b. Then, when having detected cellular communication DCI addressed to the communication terminal 40 through the blind detection, the cellular communication blind detection unit 403 outputs the detected cellular communication DCI to the cellular communication control unit 412.

The D2D communication control unit 411 notifies the mapping unit 218 of an RA result indicated in the RA field of the D2D communication DCI. Having received the D2D communication DCI from the D2D communication blind detection unit 402, the D2D communication control unit 411 transmits a signal generation instruction to the D2D signal generation unit 215.

The cellular communication control unit 412 notifies the mapping unit 224 of an RA result indicated in the RA field of the cellular communication DCI. Having received the cellular communication DCI from the cellular communication blind detection unit 403, the cellular communication control unit 412 transmits the signal generation instruction to the UL signal generation unit 221.

Operation of Base Station and Communication Terminal

Figure 12:
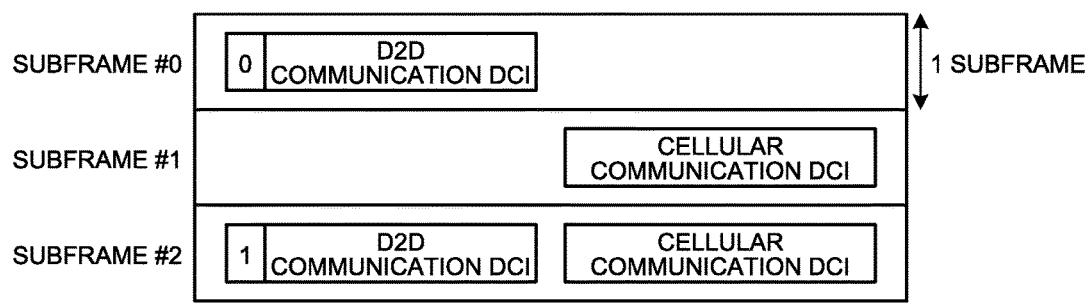
FIG. 12 is a diagram used for description of operation of the base station and the communication terminal according to the second embodiment.

FIG. 12 is a diagram used for description of operation of the base station and the communication terminal according to the second embodiment.

For example, in subframe #0, when transmitting D2D communication DCI but not cellular communication DCI, the base station 30 sets the value of the flag added to the D2D communication DCI to "0". Thus, in subframe #0, the communication terminal 40 having detected the D2D communication DCI recognizes that no cellular communication DCI exists in subframe #0 because the value of the flag is "0". Accordingly, the communication terminal 40 does not perform the blind detection of cellular communication DCI in subframe #0.

For example, in subframe #1, the base station 30 transmits cellular communication DCI but not D2D communication DCI. Accordingly, in subframe #1, no D2D communication DCI is detected by the communication terminal 40, and thus the communication terminal 40 performs the blind detection of cellular communication DCI.

For example, in subframe #2, when transmitting both of D2D communication DCI and cellular communication DCI, the base station 30 sets the value of the flag added to the D2D communication DCI to "1". Thus, in subframe #2, the communication terminal 40 having detected the D2D communication DCI recognizes that the cellular communication DCI exists in subframe #0 because the value of the flag is "1". Accordingly, the communication terminal 40 performs the blind detection of cellular communication DCI in subframe #0.

The addition of the flag to the D2D communication DCI does not necessarily need to be performed to integrate the flag and the D2D communication DCI. For example, D2D communication DCI including the flag may be generated as integration of the flag and the D2D communication DCI.

Processing at Base Station

Figure 13:
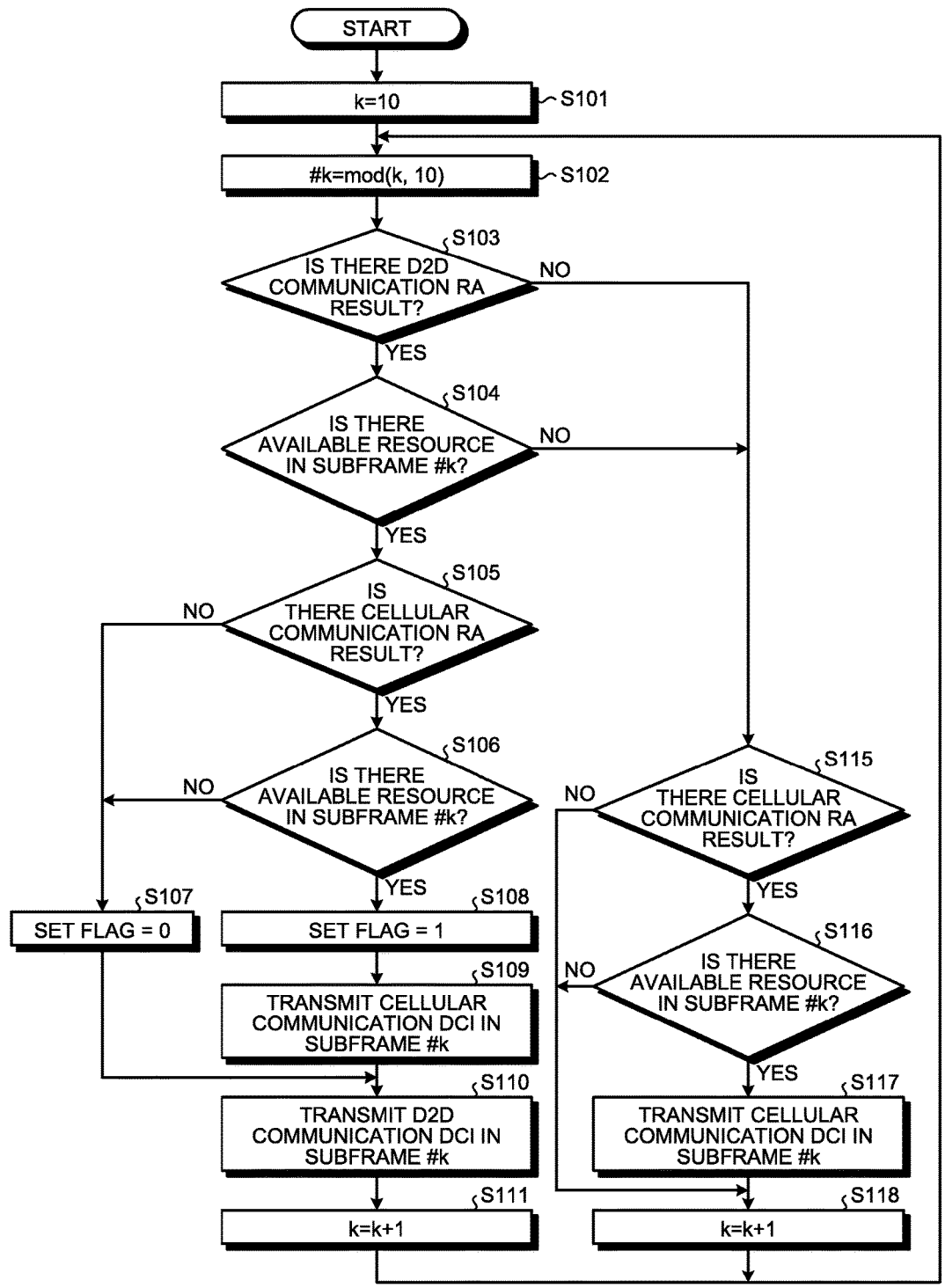
FIG. 13 is a flowchart used for description of processing at the base station according to the second embodiment.

FIG. 13 is a flowchart used for description of processing at the base station according to the second embodiment. The processing of the flowchart is started when the base station 30 is turned on.

First, the DCI generation unit 31 sets k to be an initial value of "10" (step S101).

Subsequently, the DCI generation unit 31 calculates #k as the remainder of division of k by 10 through the expression of "#k=mod(k, 10)" (step S102). Thus, when k increases from 10 by one, #k takes a value of 0 to 9. #k corresponds to a subframe number.

Subsequently, the DCI generation unit 31 determines whether there is a D2D communication RA result to be transmitted to the communication terminal 40 (step S103).

If there is a D2D communication RA result to be transmitted to the communication terminal 40 (Yes at step S103), the DCI generation unit 31 determines whether there is an available resource for transmitting D2D communication DCI in subframe #k (step S104).

If there is an available resource in subframe #k (Yes at step S104), the DCI generation unit 31 determines whether there is a cellular communication RA result to be transmitted to the communication terminal 40 (step S105).

If there is a cellular communication RA result to be transmitted to the communication terminal 40 (Yes at step S105), the DCI generation unit 31 determines whether there is an available resource for transmitting cellular communication DCI in subframe #k (step S106).

If there is an available resource in subframe #k (Yes at step S106), the DCI generation unit 31 sets the flag to "1" (step S108) and the wireless transmission unit 108 transmits the cellular communication DCI in subframe #k (step S109).

If there is no cellular communication RA result (No at step S105) or there is no available resource for transmitting cellular communication DCI in subframe #k (No at step S106), the DCI generation unit 31 sets the flag to "0" (step S107).

Subsequently, the wireless transmission unit 108 transmits the D2D communication DCI in subframe #k (step S110). Thereafter, the DCI generation unit 31 increments k by one (step S111), and the process returns to step S102.

In other words, if there is an available resource for transmitting both of D2D communication DCI and cellular communication DCI in subframe #k, cellular communication DCI and D2D communication DCI having the flag with a value of "1" are transmitted in the identical subframe #k.

If there is an available resource for transmitting D2D communication DCI in subframe #k but no available resource for transmitting cellular communication DCI, D2D communication DCI having the flag with a value of "0" is transmitted but no cellular communication DCI is transmitted in subframe #k.

If there is no D2D communication RA result (No at step S103) or there is no available resource for transmitting D2D communication DCI in subframe #k (No at step S104), the DCI generation unit 31 determines whether there is a cellular communication RA result to be transmitted to the communication terminal 40 (step S115).

If there is a cellular communication RA result to be transmitted to the communication terminal 40 (Yes at step S115), the DCI generation unit 31 determines whether there is an available resource for transmitting cellular communication DCI in subframe #k (step S116).

If there is an available resource in subframe #k (Yes at step S116), the wireless transmission unit 108 transmits the cellular communication DCI in subframe #k (step S117). Thereafter, the DCI generation unit 31 increments k by one (step S118), and the process returns to step S102.

If there is no cellular communication RA result (No at step S115) or there is no available resource for transmitting cellular communication DCI in subframe #k (No at step S116), the DCI generation unit 31 increments k by one (step S118), and the process returns to step S102.

Processing at Communication Terminal

Figure 14:
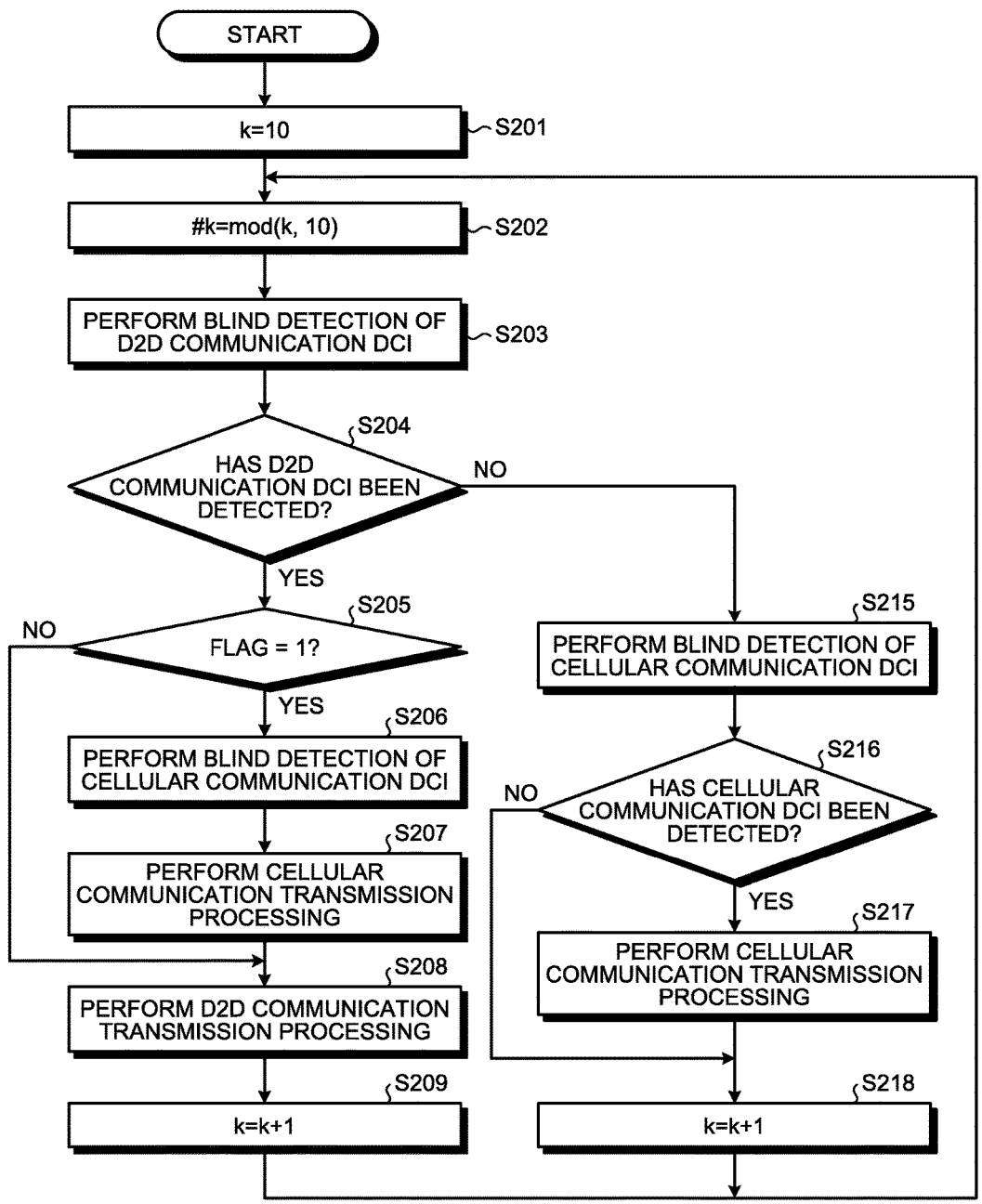
FIG. 14 is a flowchart used for description of processing at the communication terminal according to the second embodiment.

FIG. 14 is a flowchart used for description of processing at the communication terminal according to the second embodiment. The processing of the flowchart is started when the communication terminal 40 is turned on.

First, the blind detection unit 45 sets k to be an initial value of "10" (step S201).

Subsequently, the blind detection unit 45 calculates #k as the remainder of division of k by 10 through the expression of "#k=mod(k, 10)" (step S202). Thus, when k increases from 10 by one, #k takes a value of 0 to 9. #k corresponds to a subframe number.

Subsequently, the blind detection unit 45 performs the blind detection of D2D communication DCI in subframe #k (step S203).

Having detected D2D communication DCI addressed to the communication terminal through the blind detection (Yes at step S204), the blind detection unit 45 determines whether the value of the flag of the D2D communication DCI is "1" (step S205).

If the value of the flag is "1" (Yes at step S205), the blind detection unit 45 performs the blind detection of cellular communication DCI in subframe #k to detect cellular communication DCI addressed to the communication terminal (step S206). Then, the cellular communication control unit 412 and the cellular communication unit 23 perform cellular communication transmission processing (step S207).

If the value of the flag is not "1", in other words, the value of the flag is "0" (No at step S205), the processing at steps S206 and S207 is not performed, and the D2D communication control unit 411 and the D2D communication unit 22 perform D2D communication transmission processing (step S208). Thus, if the value of the flag is "0", no blind detection of cellular communication DCI is performed in subframe #k.

After the D2D communication transmission processing, the blind detection unit 45 increments k by one (step S209), and the process returns to step S202.

Having detected no D2D communication DCI addressed to the communication terminal at step S204 (No at step S204), the blind detection unit 45 performs the blind detection of cellular communication DCI in subframe #k (step S215).

Subsequently, if cellular communication DCI addressed to the communication terminal is detected through the blind detection at step S215 (Yes at step S216), the cellular communication control unit 412 and the cellular communication unit 23 perform cellular communication transmission processing (step S217).

After the cellular communication transmission processing, the blind detection unit 45 increments k by one (step S218), and the process returns to step S202.

Having detected no cellular communication DCI addressed to the communication terminal at step S216 (No at step S216), the blind detection unit 45 increments k by one (step S218), and the process returns to step S202.

As described above, in the second embodiment, the communication system 1 includes the base station BS1, the communication terminal UE1, and the communication terminal UE2. The communication terminal UE1 is capable of performing cellular communication with the base station BS1 and D2D communication with the communication terminal UE2 without routing communication signal through the base station BS1.

The base station BS1 transmits, to the communication terminal UE1, integration of D2D communication DCI for notifying the communication terminal UE1 of a D2D communication RA result and a flag indicating whether cellular communication DCI for notifying the communication terminal UE1 of a cellular communication RA result exists in a subframe in which the D2D communication DCI is transmitted.

Upon this transmission, the communication terminal UE1 detects the D2D communication DCI that the communication terminal UE1 is notified of. Then, the communication terminal UE1 determines whether to perform the detection of cellular communication DCI in a subframe in which the D2D communication DCI is transmitted on the basis of the flag integrated with the D2D communication DCI.

The base station 30 notifies the communication terminal UE1 of a RA result, the communication terminal UE1 being capable of communicating with the base station 30 and performing D2D communication with the communication terminal UE2. The base station 30 includes the DCI generation unit 31 and the wireless transmission unit 108. The DCI generation unit 31 generates D2D communication DCI for notifying the communication terminal UE1 of a D2D communication RA result, and a flag indicating whether cellular communication DCI for notifying the communication terminal UE1 of a cellular communication RA result exists in a subframe in which the D2D communication DCI is transmitted. The wireless transmission unit 108 transmits integration of the D2D communication DCI and the flag to the communication terminal UE1.

The communication terminal 40 is capable of communicating with the base station 30 configured to notify the communication terminal 40 of an RA result and performing D2D communication with the communication terminal UE2 without routing communication signal through the base station 30. The communication terminal 40 includes the D2D communication blind detection unit 402 and the cellular communication blind detection unit 403. The D2D communication blind detection unit 402 detects D2D communication DCI for notifying the communication terminal 40 of a D2D communication RA result. The cellular communication blind detection unit 403 determines whether to perform the detection of cellular communication DCI in a subframe in which the D2D communication DCI is transmitted on the basis of a flag indicating whether cellular communication DCI for notifying the communication terminal 40 of the cellular communication RA result exists in a subframe in which the D2D communication DCI is transmitted. This flag is integrated with the D2D communication DCI.

In this manner, the communication terminal UE1 (communication terminal 40) can determine whether cellular communication DCI exists in each subframe on the basis of the flag integrated with the D2D communication DCI before the blind detection of cellular communication DCI. This allows the communication terminal UE1 to avoid the blind detection of cellular communication DCI in a subframe in which it is determined that no cellular communication DCI exists. Accordingly, the maximum number of times of blind detection is smaller in a subframe in which no cellular communication DCI exists than in a subframe in which cellular communication DCI exists. For example, when a new search space is prepared for D2D communication DCI in a new format and blind detection is performed for all search spaces in one subframe, the maximum number of times of blind detection in one subframe is 60 as described above. However, 44 times of blind detection of cellular communication DCI can be avoided in a subframe in which no cellular communication DCI exists, so that the maximum number of times of blind detection is 16 for detection of D2D communication DCI as described above. Thus, according to the second embodiment, it is possible to reduce an increase in electric power consumption of the communication terminal UE1 in D2D communication when a new search space for D2D communication DCI in a new format is prepared for the D2D communication.

[c] Third Embodiment

Configuration of Base Station and Communication Terminal

A base station and a communication terminal according to a third embodiment have configurations identical to those in the second embodiment, and thus the following describes processing at the base station and the communication terminal with reference to FIGS. 9 and 11.

Processing at Base Station

As described above, in FIG. 9, in subframe #x notified by the D2D communication DCI generation unit 301, the mapping unit 305 maps a D2D communication PDCCH signal to search units of any one of search spaces SS6 to SS9 illustrated in FIG. 2, and outputs the D2D communication PDCCH signal to the wireless transmission unit 108. In subframe #y notified by the cellular communication DCI generation unit 302, the mapping unit 305 maps a cellular communication PDCCH signal to search units of any one of search spaces SS0 to SS5 illustrated in FIG. 2, and outputs the cellular communication PDCCH signal to the wireless transmission unit 108.

As described above, the PDCCH signal generation units 102 and 105 encodes DCI at a lower code rate as the quality of a downlink propagation channel to the communication terminal UE1 decreases. Specifically, the PDCCH signal generation units 102 and 105 each encode the DCI in accordance with an identical parameter value indicating the quality of the downlink propagation channel. Accordingly, the size of encoded D2D communication DCI is identical to the size of encoded cellular communication DCI.

Thus, when subframe #x are subframe #y are identical, in other words, when the cellular communication DCI is mapped to a subframe to which the D2D communication DCI is mapped, the mapping unit 305 maps both DCI to different search spaces at an identical aggregation level. For example, in FIG. 2, the mapping unit 305 maps the cellular communication DCI to SS3 when the D2D communication DCI is mapped to SS9. SS9 and SS3 have an identical aggregation level of "8".

Processing at Communication Terminal

In FIG. 11, the communication terminal 40 performs processing described below in addition to the processing in the second embodiment.

Specifically, the D2D communication blind detection unit 402 determines the aggregation level (hereinafter also referred to as "D2D communication aggregation level") of a search space to which detected D2D communication DCI is mapped, by using Expressions (1) to (3) below.

$$\text{Start position of each search unit} = L\{Y_k \cdot \text{mod}(N_{CCE,k}/L)\} + I \quad (1)$$

$$Y_k = (A \cdot Y_{k-1}) \bmod D \quad (2)$$

$$Y_{-1} = n_{RNTI} \quad (3)$$

In the above expressions, "start position of each search unit" is indicated by an index number of CCE, and "L" is any one of aggregation levels 1, 2, 4, and 8. "$N_{CCE,k}$" is the total number of CCEs for DCI included in subframe k, "k" is any one of subframe numbers 0 to 9, and "i" is the number of search units included in a search space at aggregation level L. "A" and "D" are integer values different from each other. "$n_{RNTI}$" is an ID number of the communication terminal and is used as initial value $Y_{-1}$ of $Y_k$. In LTE, the ID number of the communication terminal is allocated to the communication terminal by the base station in a process in which the communication terminal becomes an active state (RRC Connected mode) through connection with the base station. When the communication terminal is in an idle state or is connected with another base station, the allocated ID number becomes invalid. Any digit after the decimal point in a result of the mod calculation is rounded off.

The D2D communication blind detection unit 402 can identify the start position of a search unit to which D2D communication DCI detected through blind detection is mapped. Then, the D2D communication blind detection unit 402 can determine the D2D communication aggregation level on the basis of the identified start position through Expressions (1) to (3) above. Thereafter, the D2D communication blind detection unit 402 notifies the cellular communication blind detection unit 403 of the D2D communication aggregation level.

The cellular communication blind detection unit 403 performs blind detection only on a search space at an aggregation level identical to the D2D communication aggregation level notified by the D2D communication blind detection unit 402 among SS0 to SS5 in FIG. 2 described above. For example, when the base station 30 maps D2D communication DCI to SS9 and cellular communication DCI to SS3, the cellular communication blind detection unit 403 performs blind detection only on SS3 and SS5 among search spaces for cellular communication. Thus, the cellular communication blind detection unit 403 does not perform blind detection on SS0 to SS2 and SS4 among search spaces for cellular communication.

In the third embodiment, when the base station BS1 (base station 30) maps cellular communication DCI in a subframe in which D2D communication DCI is transmitted as described above, the mapping is performed as follows. Specifically, the base station BS1 maps the cellular communication DCI to, among a plurality of search spaces included in the subframe in which the D2D communication DCI is transmitted, a second search space at an aggregation level identical to an aggregation level of a first search space to which the D2D communication DCI is mapped.

This configuration leads to reduction in the number of search spaces in which the blind detection of cellular communication DCI is performed at the communication terminal UE1 (communication terminal 40). Thus, according to the third embodiment, it is possible to further reduce an increase in electric power consumption of the communication terminal UE1 in D2D communication as compared to the second embodiment.

[d] Other Embodiments

Figure 15:
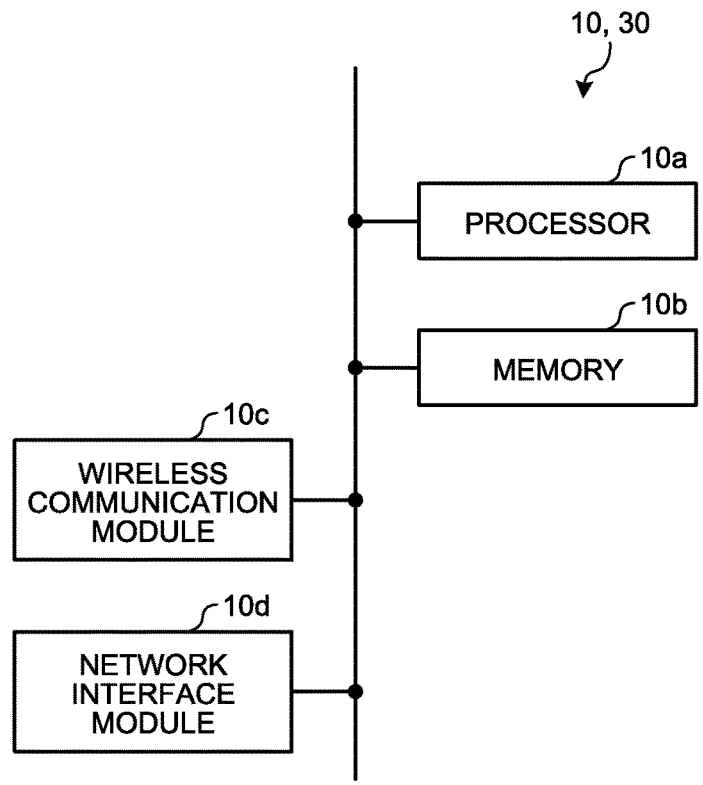
FIG. 15 is a diagram illustrating an exemplary hardware configuration of a base station.

[1] The base stations 10 and 30 according to the above-described embodiments can be achieved with a hardware configuration as follows. FIG. 15 is a diagram illustrating an exemplary hardware configuration of each base station. As illustrated in FIG. 15, the base stations 10 and 30 each include, as hardware components, a processor 10a, a memory 10b, a wireless communication module 10c, and a network interface module 10d. The processor 10a is, for example, a central processing unit (CPU), a digital signal processor (DSP), or a field programmable gate array (FPGA). The base stations 10 and 30 may each include a large scale integrated circuit (LSI) including the processor 10a and a peripheral circuit. The memory 10b is, for example, a RAM such as an SDRAM, a ROM, or a flash memory. The wireless transmission unit 108, the transmission antenna 109, the reception antenna 111, and the wireless reception unit 112 are achieved by the wireless communication module 10c. The DCI generation units 11 and 31, the PDCCH signal generation units 102 and 105, the mapping units 107 and 305, and the user data acquisition unit 113 are achieved by the processor 10a.

Figure 16:
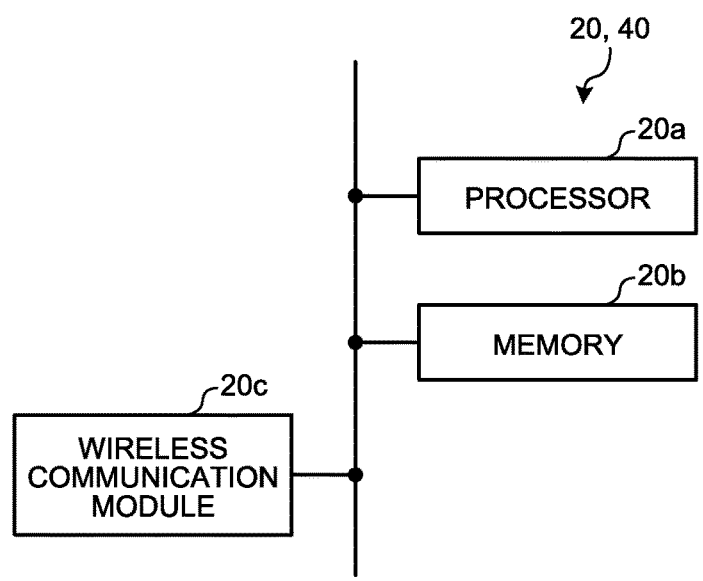
FIG. 16 is a diagram illustrating an exemplary hardware configuration of a communication terminal.

[2] The communication terminals 20 and 40 according to the above-described embodiments can be achieved with a hardware configuration as follows. FIG. 16 is a diagram illustrating an exemplary hardware configuration of each communication terminal. As illustrated in FIG. 16, the communication terminals 20 and 40 each include, as hardware components, a processor 20a, a memory 20b, and a wireless communication module 20c. The processor 20a is, for example, a CPU, a DSP, or an FPGA. The communication terminals 20 and 40 may each include an LSI including the processor 20a and a peripheral circuit. The memory 20b is, for example, a RAM such as an SDRAM, a ROM, or a flash memory. The reception antenna 201, the separator 202, the wireless reception units 203 and 206, the wireless transmission unit 225, and the transmission antenna 226 are achieved by the wireless communication module 20c. The demodulation units 204 and 207, the decoding units 205 and 208, the blind detection units 209 and 45, the communication control units 21 and 46, the D2D communication unit 22, and the cellular communication unit 23 are achieved by the processor 20a. The buffer 401 is achieved by the memory 20b.

[3] A communication terminal is also called a wireless terminal, a mobile station, or a user equipment (UE). A base station is also called a wireless base station, a base station, an eNodeB, or a NodeB.

According to an aspect of the present disclosure, it is possible to reduce an increase in electric power consumption at a communication terminal in D2D communication.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A communication system comprising:
   a base station;
   a first communication terminal; and
   a second communication terminal capable of communicating with the base station and directly communicating with the first communication terminal without routing communication signal through the base station,
   wherein
   the base station is configured to:
      notify the second communication terminal of a wireless resource allocation result by using control information including a first region, a second region, and a third region,
      set the second region and the third region to have values in a first specific combination when notifying, by using the first region, the second communication terminal of a first allocation result of a first wireless resource allocated to communication between the base station and the second communication terminal, and
      set the second region and the third region to have values in a second specific combination different from the first specific combination when notifying, by using the first region, the second communication terminal of a second allocation result of a second wireless resource allocated to direct communication between the second communication terminal and the first communication terminal, and
   the second communication terminal is configured to:
      detect the control information,
      communicate with the base station in accordance with the first allocation result indicated in the first region when having determined that the second region and the third region of the detected control information have values in the first specific combination, and
      directly communicate with the first communication terminal in accordance with the second allocation result indicated in the first region when having determined that the second region and the third region of the detected control information have values in the second specific combination.

2. The communication system according to claim 1, wherein
   the first specific combination is a combination of a value indicating new data in the second region and a value in a specific first range in the third region, or a combination of a value indicating retransmission data in the second region and a value in a second range different from the specific first range in the third region, and
   the second specific combination is a combination of a value indicating retransmission data in the second region and a value in the specific first range in the third region, or a combination of a value indicating new data in the second region and a value in the second range in the third region.

3. A base station configured to notify a second communication terminal of a wireless resource allocation result by using control information, the second communication terminal being capable of communicating with the base station and directly communicating with a first communication terminal, the base station comprising:
- a first generation unit configured to generate the control information, which comprises a first region, a second region, and a third region, in which the second region and the third region have values in a first specific combination when notifying, by using the first region, the second communication terminal of a first allocation result of a first wireless resource allocated to communication between the base station and the second communication terminal; and
- a second generation unit configured to generate the control information in which the second region and the third region have values in a second specific combination different from the first specific combination when notifying, by using the first region, the second communication terminal of a second allocation result of a second wireless resource allocated to direct communication between the second communication terminal and the first communication terminal.

4. A communication terminal capable of communicating with a base station configured to notify the communication terminal of a wireless resource allocation result by using control information comprising a first region, a second region, and a third region, and capable of directly communicating with another communication terminal without routing a communication signal through the base station, the communication terminal comprising:
- a detection unit configured to detect the control information;
- a determination unit configured to determine a combination of values in the second region and the third region of the detected control information;
- a first communication unit configured to communicate with the base station in accordance with an allocation result indicated in the first region when the combination is a first specific combination; and
- a second communication unit configured to directly communicate the other communication terminal in accordance with the allocation result indicated in the first region when the combination is a second specific combination different from the first specific combination.

5. A control information generation method executed by a base station configured to notify a communication terminal capable of directly communicating with another communication terminal of a wireless resource allocation result by using control information , the control information generation method comprising:
- generating the control information, which comprises a first region, a second region, and a third region, in which the second region and the third region have values in a first specific combination when notifying, by using the first region, the communication terminal of a first allocation result of a first wireless resource allocated to communication between the base station and the communication terminal; and
- generating the control information in which the second region and the third region have values in a second specific combination different from the first specific combination when notifying, by using the first region, the communication terminal of a second allocation result of a second wireless resource allocated to direct communication between the communication terminal and another communication terminal.

6. A control information determination method executed by a communication terminal capable of communicating with a base station configured to notify the communication terminal of a wireless resource allocation result by using control information comprising a first region, a second region, and a third region, and capable of directly communicating with another communication terminal without routing communication signal through the base station, the control information determination method comprising:
- determining that an allocation result indicated in the first region is a first allocation result of a first wireless resource allocated to communication between the base station and the communication terminal, when the second region and the third region of the control information have values in a first specific combination; and
- determining that the allocation result indicated in the first region is a second allocation result of a second wireless resource allocated to direct communication between the communication terminal and the other communication terminal, when the second region and the third region of the control information have values in a second specific combination different from the first specific combination.

7. A communication system comprising:
- a base station;
- a first communication terminal; and
- a second communication terminal configured for communicating with the base station and directly communicating with the first communication terminal without routing communication signal through the base station, wherein
- the base station is configured to transmit, to the second communication terminal, integration of first control information for notifying the second communication terminal of a first allocation result of a first wireless resource allocated to direct communication between the second communication terminal and the first communication terminal, and predetermined information indicating whether second control information for notifying the second communication terminal of a second allocation result of a second wireless resource allocated to communication between the base station and the second communication terminal exists in a time slot allotted for transmission of the first control information, and
- the second communication terminal is configured to:
  - detect the first control information, and
  - determine whether to perform detection of the second control information in the allotted time slot based on the predetermined information integrated with the first control information.

8. The communication system according to claim 7, wherein the base station maps the second control information to the allotted time slot of the first control information by mapping the second control information to a second search space having an aggregation level identical to an aggregation level of a first search space to which the first control information is mapped among a plurality of search spaces included in the allotted time slot.

9. A base station configured to notify a second communication terminal of a wireless resource allocation result, the second communication terminal being capable of communicating with the base station and directly communicating with a first communication terminal, the base station comprising:
- a generation unit configured to generate first control information for notifying the second communication terminal of a first allocation result of a first wireless resource allocated to direct communication between the second communication terminal and the first communication terminal, and predetermined information indicating whether second control information for notifying the second communication terminal of a second allocation result of a second wireless resource allocated to communication between the base station and the second communication terminal exists in a time slot allotted for transmission of the first control information; and
- a transmission unit configured to transmit integration of the first control information and the predetermined information to the second communication terminal.

10. A communication terminal capable of communicating with a base station configured to notify the communication terminal of a wireless resource allocation result and directly communicating with another communication terminal without routing communication signal through the base station, the communication terminal comprising:
- a first detection unit configured to detect first control information for notifying the communication terminal of a first allocation result of a first wireless resource allocated to direct communication between the other communication terminal and the communication terminal; and
- a second detection unit configured to determine, based on predetermined information integrated with the first control information and indicating whether second control information for notifying the communication terminal of a second allocation result of a second wireless resource allocated to communication between the base station and the communication terminal exists in a time slot allotted for transmission of the first control information, whether to perform detection of the second control information in the allotted time slot.

11. A control information notification method executed by a base station configured to notify a second communication terminal of a wireless resource allocation result, the second communication terminal being capable of communicating with the base station and directly communicating with a first communication terminal, the control information notification method comprising:
- generating first control information for notifying the second communication terminal of a first allocation result of a first wireless resource allocated to direct communication between the second communication terminal and the first communication terminal, and predetermined information indicating whether second control information for notifying the second communication terminal of a second allocation result of a second wireless resource allocated to communication between the base station and the second communication terminal exists in a time slot allotted for transmission of the first control information; and
- transmitting integration of the first control information and the predetermined information to the second communication terminal.

12. A control information detection method executed by a communication terminal capable of communicating with a base station configured to notify the communication terminal of a wireless resource allocation result and directly communicating with another communication terminal without routing communication signal through the base station, the control information detection method comprising:
- detecting first control information for notifying the communication terminal of a first allocation result of a first wireless resource allocated to direct communication between the other communication terminal and the communication terminal; and
- determining, based on predetermined information integrated with the first control information and indicating whether second control information for notifying the communication terminal of a second allocation result of a second wireless resource allocated to communication between the base station and the communication terminal exists in a time slot allotted for transmission of the first control information, whether to perform detection of the second control information in the allotted time slot.

* * * * *